(12) United States Patent
Schafer et al.

(10) Patent No.: US 10,037,057 B2
(45) Date of Patent: Jul. 31, 2018

(54) FRICTION HINGE

(71) Applicant: Microsoft Technology Licensing, LLC, Redmond, WA (US)

(72) Inventors: Christopher A. Schafer, Redmond, WA (US); Daniel C. Park, Woodinville, WA (US); Brett Andrew Tomky, Seattle, WA (US); Nicholas B. Wendt, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 77 days.

(21) Appl. No.: 15/272,916

(22) Filed: Sep. 22, 2016

(65) Prior Publication Data

US 2018/0081404 A1  Mar. 22, 2018

(51) Int. Cl.
*G06F 1/16* (2006.01)
*E05D 11/08* (2006.01)
*F16M 11/20* (2006.01)

(52) U.S. Cl.
CPC .......... *G06F 1/1681* (2013.01); *E05D 11/082* (2013.01); *F16M 11/2021* (2013.01); *G06F 1/1616* (2013.01); *E05D 2011/085* (2013.01); *E05Y 2900/606* (2013.01)

(58) Field of Classification Search
CPC ............ E05Y 2900/606; G06F 1/1681; F16M 13/005; E05D 11/1028; E05D 2011/085; H05K 5/0226
See application file for complete search history.

(56) References Cited

U.S. PATENT DOCUMENTS

| 375,394   | A | 12/1887 | Strachan        |
|-----------|---|---------|-----------------|
| 457,824   | A | 8/1891  | Curtis          |
| 578,325   | A | 3/1897  | Fleming         |
| 2,056,805 | A | 10/1936 | Reichard        |
| 2,770,834 | A | 11/1956 | Jannace         |
| 3,849,834 | A | 11/1974 | Mayer           |
| 4,046,975 | A | 9/1977  | Seeger, Jr.     |
| 4,065,649 | A | 12/1977 | Carter et al.   |
| 4,243,861 | A | 1/1981  | Strandwitz      |
| 4,302,648 | A | 11/1981 | Sado et al.     |
| 4,317,013 | A | 2/1982  | Larson          |
| 4,365,130 | A | 12/1982 | Christensen     |
| 4,492,829 | A | 1/1985  | Rodrique        |
| 4,527,021 | A | 7/1985  | Morikawa et al. |
| 4,559,426 | A | 12/1985 | Van Zeeland et al. |
| 4,577,822 | A | 3/1986  | Wilkerson       |
| 4,588,187 | A | 5/1986  | Dell            |

(Continued)

FOREIGN PATENT DOCUMENTS

| CA | 990023  | 6/1976 |
|----|---------|--------|
| CN | 2881760 | 3/2007 |

(Continued)

OTHER PUBLICATIONS

"Corrected Notice of Allowance", U.S. Appl. No. 14/743,137, dated Jun. 22, 2017, 5 pages.

(Continued)

*Primary Examiner* — Bradley Duckworth

(57) ABSTRACT

A friction hinge is described. Generally, the friction hinge provides a variable torque profile for a movable component.

20 Claims, 24 Drawing Sheets

(56) References Cited

U.S. PATENT DOCUMENTS

| | | |
|---|---|---|
| 4,607,147 A | 8/1986 | Ono et al. |
| 4,651,133 A | 3/1987 | Ganesan et al. |
| 4,735,394 A | 4/1988 | Facco |
| 5,008,497 A | 4/1991 | Asher |
| 5,128,829 A | 7/1992 | Loew |
| 5,220,521 A | 6/1993 | Kikinis |
| 5,283,559 A | 2/1994 | Kalendra et al. |
| 5,331,443 A | 7/1994 | Stanisci |
| 5,375,076 A | 12/1994 | Goodrich et al. |
| 5,480,118 A | 1/1996 | Cross |
| 5,546,271 A | 8/1996 | Gut et al. |
| 5,548,477 A | 8/1996 | Kumar et al. |
| 5,558,577 A | 9/1996 | Kato |
| 5,666,694 A | 9/1997 | Slow et al. |
| 5,681,220 A | 10/1997 | Bertram et al. |
| 5,737,183 A | 4/1998 | Kobayashi et al. |
| 5,745,376 A | 4/1998 | Barker et al. |
| 5,748,114 A | 5/1998 | Koehn |
| 5,771,540 A | 6/1998 | Carpenter et al. |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,842,027 A | 11/1998 | Oprescu et al. |
| 5,861,990 A | 1/1999 | Tedesco |
| 5,874,697 A | 2/1999 | Selker et al. |
| 5,905,485 A | 5/1999 | Podoloff |
| 5,926,170 A | 7/1999 | Oba |
| 5,971,635 A | 10/1999 | Wise |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,061,644 A | 5/2000 | Leis |
| 6,108,200 A | 8/2000 | Fullerton |
| 6,112,797 A | 9/2000 | Colson et al. |
| 6,125,509 A | 10/2000 | Hartigan et al. |
| 6,128,007 A | 10/2000 | Seybold |
| 6,141,388 A | 10/2000 | Servais et al. |
| 6,178,443 B1 | 1/2001 | Lin |
| 6,233,138 B1 | 5/2001 | Osgood |
| 6,254,105 B1 | 7/2001 | Rinde et al. |
| 6,279,060 B1 | 8/2001 | Luke et al. |
| 6,292,981 B1 | 9/2001 | Ford et al. |
| 6,329,617 B1 | 12/2001 | Burgess |
| 6,341,407 B1 | 1/2002 | Hayashida |
| 6,344,791 B1 | 2/2002 | Armstrong |
| 6,366,440 B1 | 4/2002 | Kung |
| 6,380,497 B1 | 4/2002 | Hashimoto et al. |
| 6,437,682 B1 | 8/2002 | Vance |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,553,625 B2 | 4/2003 | Lin et al. |
| 6,565,439 B2 | 5/2003 | Shinohara et al. |
| 6,597,347 B1 | 7/2003 | Yasutake |
| 6,600,121 B1 | 7/2003 | Olodort et al. |
| 6,603,408 B1 | 8/2003 | Gaba |
| 6,608,664 B1 | 8/2003 | Hasegawa |
| 6,617,536 B2 | 9/2003 | Kawaguchi |
| 6,651,943 B2 | 11/2003 | Cho et al. |
| 6,685,369 B2 | 2/2004 | Lien |
| 6,695,273 B2 | 2/2004 | Iguchi |
| 6,704,864 B1 | 3/2004 | Philyaw |
| 6,721,019 B2 | 4/2004 | Kono et al. |
| 6,725,318 B1 | 4/2004 | Sherman et al. |
| 6,774,888 B1 | 8/2004 | Genduso |
| 6,776,546 B2 | 8/2004 | Kraus et al. |
| 6,781,819 B2 | 8/2004 | Yang et al. |
| 6,784,869 B1 | 8/2004 | Clark et al. |
| 6,813,143 B2 | 11/2004 | Makela |
| 6,819,316 B2 | 11/2004 | Schulz et al. |
| 6,856,506 B2 | 2/2005 | Doherty et al. |
| 6,856,789 B2 | 2/2005 | Pattabiraman et al. |
| 6,861,961 B2 | 3/2005 | Sandbach et al. |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 7,007,238 B2 | 2/2006 | Glaser |
| 7,051,149 B2 | 5/2006 | Wang et al. |
| 7,079,874 B2 | 7/2006 | Pontoppidan et al. |
| 7,083,295 B1 | 8/2006 | Hanna |
| 7,091,436 B2 | 8/2006 | Serban |
| 7,099,149 B2 | 8/2006 | Krieger et al. |
| 7,106,222 B2 | 9/2006 | Ward et al. |
| 7,123,292 B1 | 10/2006 | Seeger et al. |
| 7,152,985 B2 | 12/2006 | Benitez et al. |
| D535,292 S | 1/2007 | Shi et al. |
| 7,192,105 B2 | 3/2007 | Jung |
| 7,194,662 B2 | 3/2007 | Do et al. |
| 7,213,991 B2 | 5/2007 | Chapman et al. |
| 7,232,098 B2 | 6/2007 | Rawlings et al. |
| 7,239,505 B2 | 7/2007 | Keely et al. |
| 7,260,221 B1 | 8/2007 | Atsmon |
| 7,277,087 B2 | 10/2007 | Hill et al. |
| 7,301,759 B2 | 11/2007 | Hsiung |
| 7,447,934 B2 | 11/2008 | Dasari et al. |
| 7,469,386 B2 | 12/2008 | Bear et al. |
| 7,486,165 B2 | 2/2009 | Ligtenberg et al. |
| 7,499,037 B2 | 3/2009 | Lube |
| 7,502,803 B2 | 3/2009 | Cutter et al. |
| 7,542,052 B2 | 6/2009 | Solomon et al. |
| 7,543,358 B2 | 6/2009 | Lin et al. |
| 7,558,594 B2 | 7/2009 | Wilson |
| 7,559,834 B1 | 7/2009 | York |
| RE40,891 E | 9/2009 | Yasutake |
| 7,636,921 B2 | 12/2009 | Louie |
| 7,639,876 B2 | 12/2009 | Clary et al. |
| 7,656,392 B2 | 2/2010 | Bolender |
| 7,729,493 B2 | 6/2010 | Krieger et al. |
| 7,731,147 B2 | 6/2010 | Rha |
| 7,733,326 B1 | 6/2010 | Adiseshan |
| 7,761,119 B2 | 7/2010 | Patel |
| 7,777,972 B1 | 8/2010 | Chen et al. |
| 7,782,342 B2 | 8/2010 | Koh |
| 7,813,715 B2 | 10/2010 | McKillop et al. |
| 7,822,338 B2 | 10/2010 | Wernersson |
| 7,865,639 B2 | 1/2011 | McCoy et al. |
| 7,884,807 B2 | 2/2011 | Hovden et al. |
| 7,913,357 B2 | 3/2011 | Peng et al. |
| D636,397 S | 4/2011 | Green |
| 7,928,964 B2 | 4/2011 | Kolmykov-Zotov et al. |
| 7,944,520 B2 | 5/2011 | Ichioka et al. |
| 7,945,717 B2 | 5/2011 | Rivalsi |
| 7,967,462 B2 | 6/2011 | Ogiro et al. |
| 7,973,771 B2 | 7/2011 | Geaghan |
| 7,978,281 B2 | 7/2011 | Vergith et al. |
| 8,016,255 B2 | 9/2011 | Lin |
| 8,018,714 B2 | 9/2011 | Luke et al. |
| 8,053,688 B2 | 11/2011 | Conzola et al. |
| 8,065,624 B2 | 11/2011 | Morin et al. |
| 8,069,356 B2 | 11/2011 | Rathi et al. |
| 8,074,956 B2 | 12/2011 | Wang et al. |
| 8,090,885 B2 | 1/2012 | Callaghan et al. |
| 8,098,233 B2 | 1/2012 | Hotelling et al. |
| 8,115,499 B2 | 2/2012 | Osoinach et al. |
| 8,117,362 B2 | 2/2012 | Rodriguez et al. |
| 8,118,274 B2 | 2/2012 | McClure et al. |
| 8,130,203 B2 | 3/2012 | Westerman |
| 8,154,524 B2 | 4/2012 | Wilson et al. |
| 8,162,282 B2 | 4/2012 | Hu et al. |
| D659,139 S | 5/2012 | Gengler |
| 8,169,421 B2 | 5/2012 | Wright et al. |
| 8,224,405 B2 | 7/2012 | Lombardi et al. |
| 8,229,509 B2 | 7/2012 | Paek et al. |
| 8,229,522 B2 | 7/2012 | Kim et al. |
| 8,230,992 B2 | 7/2012 | Law et al. |
| 8,231,099 B2 | 7/2012 | Chen |
| 8,248,791 B2 | 8/2012 | Wang et al. |
| 8,255,708 B1 | 8/2012 | Zhang |
| 8,264,310 B2 | 9/2012 | Lauder et al. |
| 8,267,368 B2 | 9/2012 | Torii et al. |

(56) References Cited

U.S. PATENT DOCUMENTS

| | | |
|---|---|---|
| 8,274,784 B2 | 9/2012 | Franz et al. |
| 8,279,589 B2 | 10/2012 | Kim |
| 8,322,290 B1 | 12/2012 | Mignano |
| 8,335,079 B2 | 12/2012 | Yeh |
| 8,387,078 B2 | 2/2013 | Memmott |
| 8,390,995 B2 | 3/2013 | Wang et al. |
| 8,403,288 B2 | 3/2013 | Cheng |
| 8,416,559 B2 | 4/2013 | Agata et al. |
| 8,498,100 B1 | 7/2013 | Whitt, III et al. |
| 8,514,568 B2 | 8/2013 | Qiao et al. |
| 8,523,131 B2 | 9/2013 | Derry et al. |
| 8,543,227 B1 | 9/2013 | Perek et al. |
| 8,548,608 B2 | 10/2013 | Perek et al. |
| 8,564,944 B2 | 10/2013 | Whitt, III et al. |
| 8,570,725 B2 | 10/2013 | Whitt, III et al. |
| 8,599,542 B1 | 12/2013 | Healey et al. |
| 8,610,015 B2 | 12/2013 | Whitt et al. |
| 8,614,666 B2 | 12/2013 | Whitman et al. |
| 8,646,999 B2 | 2/2014 | Shaw et al. |
| 8,699,215 B2 | 4/2014 | Whitt, III et al. |
| 8,719,603 B2 | 5/2014 | Belesiu |
| 8,724,302 B2 | 5/2014 | Whitt et al. |
| 8,744,391 B2 | 6/2014 | Tenbrook et al. |
| 9,134,808 B2 | 9/2015 | Siddiqui et al. |
| 9,198,312 B2 | 11/2015 | Zhang et al. |
| 9,310,848 B2 | 4/2016 | Fujino et al. |
| 9,512,655 B2 | 12/2016 | Kuo |
| 9,549,479 B2 | 1/2017 | Gault et al. |
| 9,752,361 B2 | 9/2017 | Park |
| 9,759,242 B2 | 9/2017 | Hsu |
| 9,766,663 B2 | 9/2017 | Siddiqui et al. |
| 9,864,415 B2 | 1/2018 | Siddiqui |
| 9,964,998 B2 | 5/2018 | Park et al. |
| 2002/0044216 A1 | 4/2002 | Cha |
| 2002/0134828 A1 | 9/2002 | Sandbach et al. |
| 2003/0163611 A1 | 8/2003 | Nagao |
| 2003/0197687 A1 | 10/2003 | Shetter |
| 2003/0222848 A1 | 12/2003 | Solomon et al. |
| 2004/0056843 A1 | 3/2004 | Lin et al. |
| 2004/0156168 A1 | 8/2004 | LeVasseur et al. |
| 2004/0212601 A1 | 10/2004 | Cake et al. |
| 2004/0258924 A1 | 12/2004 | Berger et al. |
| 2004/0268000 A1 | 12/2004 | Barker et al. |
| 2005/0030728 A1 | 2/2005 | Kawashima et al. |
| 2005/0052831 A1 | 3/2005 | Chen |
| 2005/0055498 A1 | 3/2005 | Beckert et al. |
| 2005/0057515 A1 | 3/2005 | Bathiche |
| 2005/0059489 A1 | 3/2005 | Kim |
| 2005/0099400 A1 | 5/2005 | Lee |
| 2005/0134717 A1 | 6/2005 | Misawa |
| 2005/0146512 A1 | 7/2005 | Hill et al. |
| 2005/0204509 A1 | 9/2005 | Lin et al. |
| 2005/0264653 A1 | 12/2005 | Starkweather et al. |
| 2005/0264988 A1 | 12/2005 | Nicolosi |
| 2006/0085658 A1 | 4/2006 | Allen et al. |
| 2006/0125799 A1 | 6/2006 | Hillis et al. |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0187216 A1 | 8/2006 | Trent, Jr. et al. |
| 2006/0195522 A1 | 8/2006 | Miyazaki |
| 2006/0227393 A1 | 10/2006 | Herloski |
| 2006/0272128 A1 | 12/2006 | Rude |
| 2007/0003267 A1 | 1/2007 | Shibutani |
| 2007/0056385 A1 | 3/2007 | Lorenz |
| 2007/0062089 A1 | 3/2007 | Homer et al. |
| 2007/0069153 A1 | 3/2007 | Pai-Paranjape et al. |
| 2007/0072474 A1 | 3/2007 | Beasley et al. |
| 2007/0145945 A1 | 6/2007 | McGinley et al. |
| 2007/0164191 A1 | 7/2007 | Kim |
| 2007/0176902 A1 | 8/2007 | Newman et al. |
| 2007/0182663 A1 | 8/2007 | Biech |
| 2007/0182722 A1 | 8/2007 | Hotelling et al. |
| 2007/0185590 A1 | 8/2007 | Reindel et al. |
| 2007/0200830 A1 | 8/2007 | Yamamoto |
| 2007/0220708 A1 | 9/2007 | Lewis |
| 2007/0234420 A1 | 10/2007 | Novotney et al. |
| 2007/0236408 A1 | 10/2007 | Yamaguchi et al. |
| 2007/0236475 A1 | 10/2007 | Wherry |
| 2007/0236873 A1 | 10/2007 | Yukawa et al. |
| 2007/0247432 A1 | 10/2007 | Oakley |
| 2007/0260892 A1 | 11/2007 | Paul et al. |
| 2007/0283179 A1 | 12/2007 | Burnett et al. |
| 2008/0005423 A1 | 1/2008 | Jacobs et al. |
| 2008/0053222 A1 | 3/2008 | Ehrensvard et al. |
| 2008/0059888 A1 | 3/2008 | Dunko |
| 2008/0104437 A1 | 5/2008 | Lee |
| 2008/0151478 A1 | 6/2008 | Chern |
| 2008/0158185 A1 | 7/2008 | Westerman |
| 2008/0174570 A1 | 7/2008 | Jobs et al. |
| 2008/0186660 A1 | 8/2008 | Yang |
| 2008/0228969 A1 | 9/2008 | Cheah et al. |
| 2008/0238884 A1 | 10/2008 | Harish |
| 2008/0253822 A1 | 10/2008 | Matias |
| 2008/0309636 A1 | 12/2008 | Feng et al. |
| 2008/0316002 A1 | 12/2008 | Brunet et al. |
| 2008/0320190 A1 | 12/2008 | Lydon et al. |
| 2009/0009476 A1 | 1/2009 | Daley, III |
| 2009/0073957 A1 | 3/2009 | Newland et al. |
| 2009/0083562 A1 | 3/2009 | Park et al. |
| 2009/0140985 A1 | 6/2009 | Liu |
| 2009/0195497 A1 | 8/2009 | Fitzgerald et al. |
| 2009/0231275 A1 | 9/2009 | Odgers |
| 2009/0251008 A1 | 10/2009 | Sugaya |
| 2009/0259865 A1 | 10/2009 | Sheynblat et al. |
| 2009/0262492 A1 | 10/2009 | Whitchurch et al. |
| 2009/0265670 A1 | 10/2009 | Kim et al. |
| 2009/0285491 A1 | 11/2009 | Ravenscroft et al. |
| 2009/0296331 A1 | 12/2009 | Choy |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0013319 A1 | 1/2010 | Kamiyama et al. |
| 2010/0026656 A1 | 2/2010 | Hotelling et al. |
| 2010/0038821 A1 | 2/2010 | Jenkins et al. |
| 2010/0045633 A1 | 2/2010 | Gettemy |
| 2010/0051432 A1 | 3/2010 | Lin et al. |
| 2010/0053534 A1 | 3/2010 | Hsieh et al. |
| 2010/0072334 A1 | 3/2010 | Le Gette et al. |
| 2010/0077237 A1 | 3/2010 | Sawyers |
| 2010/0085321 A1 | 4/2010 | Pundsack |
| 2010/0102182 A1 | 4/2010 | Lin |
| 2010/0103112 A1 | 4/2010 | Yoo et al. |
| 2010/0123686 A1 | 5/2010 | Klinghult et al. |
| 2010/0133398 A1 | 6/2010 | Chiu et al. |
| 2010/0133414 A1 | 6/2010 | Lee et al. |
| 2010/0142130 A1 | 6/2010 | Wang et al. |
| 2010/0149111 A1 | 6/2010 | Olien |
| 2010/0149377 A1 | 6/2010 | Shintani et al. |
| 2010/0154171 A1 | 6/2010 | Lombardi et al. |
| 2010/0161522 A1 | 6/2010 | Tirpak et al. |
| 2010/0164857 A1 | 7/2010 | Liu et al. |
| 2010/0164897 A1 | 7/2010 | Morin et al. |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0188299 A1 | 7/2010 | Rinehart et al. |
| 2010/0206614 A1 | 8/2010 | Park et al. |
| 2010/0222110 A1 | 9/2010 | Kim et al. |
| 2010/0231556 A1 | 9/2010 | Mines et al. |
| 2010/0235546 A1 | 9/2010 | Terlizzi et al. |
| 2010/0238620 A1 | 9/2010 | Fish |
| 2010/0250988 A1 | 9/2010 | Okuda et al. |
| 2010/0271771 A1 | 10/2010 | Wu et al. |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0295812 A1 | 11/2010 | Burns et al. |
| 2010/0302378 A1 | 12/2010 | Marks et al. |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |

(56) References Cited

U.S. PATENT DOCUMENTS

| | | |
|---|---|---|
| 2010/0321877 A1 | 12/2010 | Moser |
| 2010/0324457 A1 | 12/2010 | Bean et al. |
| 2010/0325155 A1 | 12/2010 | Skinner et al. |
| 2011/0012873 A1 | 1/2011 | Prest et al. |
| 2011/0019123 A1 | 1/2011 | Prest et al. |
| 2011/0025176 A1 | 2/2011 | McClure et al. |
| 2011/0031287 A1 | 2/2011 | Le Gette et al. |
| 2011/0036965 A1 | 2/2011 | Zhang et al. |
| 2011/0037721 A1 | 2/2011 | Cranfill et al. |
| 2011/0043990 A1 | 2/2011 | Mickey et al. |
| 2011/0055407 A1 | 3/2011 | Lydon et al. |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0102326 A1 | 5/2011 | Casparian et al. |
| 2011/0115713 A1 | 5/2011 | Altman et al. |
| 2011/0134032 A1 | 6/2011 | Chiu et al. |
| 2011/0149510 A1 | 6/2011 | Monsalve et al. |
| 2011/0157046 A1 | 6/2011 | Lee et al. |
| 2011/0157087 A1 | 6/2011 | Kanehira et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0169762 A1 | 7/2011 | Weiss |
| 2011/0170289 A1 | 7/2011 | Allen et al. |
| 2011/0176035 A1 | 7/2011 | Poulsen |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0205372 A1 | 8/2011 | Miramontes |
| 2011/0227913 A1 | 9/2011 | Hyndman |
| 2011/0231682 A1 | 9/2011 | Kakish et al. |
| 2011/0248152 A1 | 10/2011 | Svajda et al. |
| 2011/0248920 A1 | 10/2011 | Larsen |
| 2011/0261001 A1 | 10/2011 | Liu |
| 2011/0267272 A1 | 11/2011 | Meyer et al. |
| 2011/0290686 A1 | 12/2011 | Huang |
| 2011/0295697 A1 | 12/2011 | Boston et al. |
| 2011/0297566 A1 | 12/2011 | Gallagher et al. |
| 2011/0298919 A1 | 12/2011 | Maglaque |
| 2011/0304577 A1 | 12/2011 | Brown et al. |
| 2011/0316807 A1 | 12/2011 | Corrion |
| 2012/0007821 A1 | 1/2012 | Zaliva |
| 2012/0023459 A1 | 1/2012 | Westerman |
| 2012/0024682 A1 | 2/2012 | Huang et al. |
| 2012/0032891 A1 | 2/2012 | Parivar |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0068919 A1 | 3/2012 | Lauder et al. |
| 2012/0069540 A1 | 3/2012 | Lauder et al. |
| 2012/0075249 A1 | 3/2012 | Hoch |
| 2012/0092279 A1 | 4/2012 | Martin |
| 2012/0094257 A1 | 4/2012 | Pillischer et al. |
| 2012/0099749 A1 | 4/2012 | Rubin et al. |
| 2012/0113579 A1 | 5/2012 | Agata et al. |
| 2012/0117409 A1 | 5/2012 | Lee et al. |
| 2012/0127118 A1 | 5/2012 | Nolting et al. |
| 2012/0140396 A1 | 6/2012 | Zeliff et al. |
| 2012/0145525 A1 | 6/2012 | Ishikawa |
| 2012/0161406 A1 | 6/2012 | Mersky |
| 2012/0162693 A1 | 6/2012 | Ito |
| 2012/0175487 A1 | 7/2012 | Goto |
| 2012/0176741 A1 | 7/2012 | Wu et al. |
| 2012/0182242 A1 | 7/2012 | Lindahl et al. |
| 2012/0182743 A1 | 7/2012 | Chou |
| 2012/0194448 A1 | 8/2012 | Rothkopf |
| 2012/0194972 A1 | 8/2012 | Bohn et al. |
| 2012/0215284 A1 | 8/2012 | Berg et al. |
| 2012/0224073 A1 | 9/2012 | Miyahara |
| 2012/0229634 A1 | 9/2012 | Laett et al. |
| 2012/0246377 A1 | 9/2012 | Bhesania et al. |
| 2012/0249443 A1 | 10/2012 | Anderson et al. |
| 2012/0256959 A1 | 10/2012 | Ye et al. |
| 2012/0274811 A1 | 11/2012 | Bakin |
| 2012/0300275 A1 | 11/2012 | Vilardell et al. |
| 2012/0312955 A1 | 12/2012 | Randolph |
| 2012/0326003 A1 | 12/2012 | Solow et al. |
| 2013/0009413 A1 | 1/2013 | Chiu et al. |
| 2013/0027867 A1 | 1/2013 | Lauder et al. |
| 2013/0044074 A1 | 2/2013 | Park et al. |
| 2013/0063873 A1 | 3/2013 | Wodrich et al. |
| 2013/0067126 A1 | 3/2013 | Casparian et al. |
| 2013/0076617 A1 | 3/2013 | Csaszar et al. |
| 2013/0088431 A1 | 4/2013 | Ballagas et al. |
| 2013/0100597 A1 | 4/2013 | Berg et al. |
| 2013/0106766 A1 | 5/2013 | Yilmaz et al. |
| 2013/0162554 A1 | 6/2013 | Lauder et al. |
| 2013/0172906 A1 | 7/2013 | Olson et al. |
| 2013/0175421 A1 | 7/2013 | Faulk et al. |
| 2013/0193292 A1 | 8/2013 | Hsu et al. |
| 2013/0217451 A1 | 8/2013 | Komiyama et al. |
| 2013/0227836 A1 | 9/2013 | Whitt, III et al. |
| 2013/0228023 A1 | 9/2013 | Drasnin |
| 2013/0228433 A1 | 9/2013 | Shaw |
| 2013/0228434 A1 | 9/2013 | Whitt, III |
| 2013/0228439 A1 | 9/2013 | Whitt, III |
| 2013/0229100 A1 | 9/2013 | Siddiqui et al. |
| 2013/0229335 A1 | 9/2013 | Whitman |
| 2013/0229347 A1 | 9/2013 | Lutz, III |
| 2013/0229350 A1 | 9/2013 | Shaw et al. |
| 2013/0229351 A1 | 9/2013 | Whitt, III |
| 2013/0229354 A1 | 9/2013 | Whitt, III et al. |
| 2013/0229363 A1 | 9/2013 | Whitman |
| 2013/0229366 A1 | 9/2013 | Dighde |
| 2013/0229380 A1 | 9/2013 | Lutz, III |
| 2013/0229534 A1 | 9/2013 | Panay |
| 2013/0229568 A1 | 9/2013 | Belesiu et al. |
| 2013/0229570 A1 | 9/2013 | Beck et al. |
| 2013/0229756 A1 | 9/2013 | Whitt, III |
| 2013/0229757 A1 | 9/2013 | Whitt, III et al. |
| 2013/0229758 A1 | 9/2013 | Belesiu et al. |
| 2013/0229759 A1 | 9/2013 | Whitt, III et al. |
| 2013/0229760 A1 | 9/2013 | Whitt, III |
| 2013/0229761 A1 | 9/2013 | Shaw |
| 2013/0229762 A1 | 9/2013 | Whitt, III |
| 2013/0229773 A1 | 9/2013 | Siddiqui et al. |
| 2013/0230346 A1 | 9/2013 | Shaw |
| 2013/0231755 A1 | 9/2013 | Perek |
| 2013/0232280 A1 | 9/2013 | Perek |
| 2013/0232348 A1 | 9/2013 | Oler |
| 2013/0232349 A1 | 9/2013 | Oler et al. |
| 2013/0232350 A1 | 9/2013 | Belesiu et al. |
| 2013/0232353 A1 | 9/2013 | Belesiu |
| 2013/0232571 A1 | 9/2013 | Belesiu |
| 2013/0262886 A1 | 10/2013 | Nishimura |
| 2013/0300590 A1 | 11/2013 | Dietz |
| 2013/0300647 A1 | 11/2013 | Drasnin |
| 2013/0301199 A1 | 11/2013 | Whitt |
| 2013/0301206 A1 | 11/2013 | Whitt |
| 2013/0304941 A1 | 11/2013 | Drasnin |
| 2013/0322000 A1 | 12/2013 | Whitt |
| 2013/0322001 A1 | 12/2013 | Whitt |
| 2013/0329360 A1 | 12/2013 | Aldana |
| 2013/0332628 A1 | 12/2013 | Panay |
| 2013/0335891 A1 | 12/2013 | Chen et al. |
| 2013/0339757 A1 | 12/2013 | Reddy |
| 2014/0012401 A1 | 1/2014 | Perek et al. |
| 2014/0021727 A1 | 1/2014 | Mai et al. |
| 2014/0029180 A1 | 1/2014 | Nishimura et al. |
| 2014/0036429 A1 | 2/2014 | Bryan et al. |
| 2014/0036430 A1 | 2/2014 | Wroblewski et al. |
| 2014/0043275 A1 | 2/2014 | Whitman |
| 2014/0047672 A1 | 2/2014 | Saito et al. |
| 2014/0048399 A1 | 2/2014 | Whitt, III |
| 2014/0076748 A1 | 3/2014 | Padilla et al. |
| 2014/0083883 A1 | 3/2014 | Elias |
| 2014/0119802 A1 | 5/2014 | Shaw |
| 2014/0132550 A1 | 5/2014 | McCracken et al. |
| 2014/0174960 A1 | 6/2014 | Zho |
| 2014/0263939 A1 | 9/2014 | Rinner |
| 2014/0293534 A1 | 10/2014 | Siddiqui |

(56) References Cited

U.S. PATENT DOCUMENTS

| | | | |
|---|---|---|---|
| 2014/0317882 A1 | 10/2014 | Chen et al. | |
| 2014/0376179 A1 | 12/2014 | Jenkins et al. | |
| 2015/0022961 A1 | 1/2015 | Jenkins et al. | |
| 2015/0092335 A1 | 4/2015 | Patrick et al. | |
| 2015/0185783 A1 | 7/2015 | Hui et al. | |
| 2015/0212553 A1 | 7/2015 | Park et al. | |
| 2015/0342067 A1 | 11/2015 | Gault et al. | |
| 2015/0362962 A1 | 12/2015 | Lee et al. | |
| 2016/0090767 A1 | 3/2016 | Park et al. | |
| 2016/0320811 A1* | 11/2016 | Lin | G06F 1/1681 |
| 2016/0369543 A1 | 12/2016 | Park | |
| 2017/0003719 A1* | 1/2017 | Siddiqui | E05D 1/04 |
| 2017/0068284 A1 | 3/2017 | Park et al. | |
| 2017/0208703 A1* | 7/2017 | Lin | E05F 1/1016 |
| 2017/0257961 A1* | 9/2017 | Chen | H05K 5/0226 |
| 2017/0269637 A1* | 9/2017 | Lin | G06F 1/1615 |
| 2017/0284457 A1 | 10/2017 | Park | |
| 2017/0292302 A1* | 10/2017 | Tomky | E05D 11/082 |
| 2017/0344067 A1* | 11/2017 | Lan | E05D 3/18 |
| 2018/0129253 A1 | 5/2018 | Siddiqui | |

FOREIGN PATENT DOCUMENTS

| | | |
|---|---|---|
| CN | 202441167 | 9/2012 |
| CN | 102937231 | 2/2013 |
| CN | 103455087 A | 12/2013 |
| CN | 103455149 | 12/2013 |
| DE | 202010005274 | 7/2010 |
| EP | 1223722 | 7/2002 |
| EP | 1591891 | 11/2005 |
| EP | 2353978 | 8/2011 |
| GB | 2123213 | 1/1984 |
| JP | 56108127 | 8/1981 |
| JP | 10326124 | 12/1998 |
| JP | 1173239 | 3/1999 |
| JP | 2005084255 | 3/2005 |
| JP | 2006294361 | 10/2006 |
| JP | 2007258774 | 10/2007 |
| JP | 2007279577 | 10/2007 |
| JP | 2009222079 | 10/2009 |
| JP | 2009232326 | 10/2009 |
| JP | 2010109589 | 5/2010 |
| JP | 2012182456 | 9/2012 |
| KR | 1020110087178 | 8/2011 |
| WO | WO-9845769 | 10/1998 |
| WO | WO-1999019995 | 4/1999 |
| WO | WO-2005064436 | 7/2005 |
| WO | WO-2006044818 | 4/2006 |
| WO | WO-2009034484 | 3/2009 |
| WO | WO-2014209383 | 12/2014 |
| WO | 2016053918 A1 | 4/2016 |
| WO | 2016204891 A1 | 12/2016 |

OTHER PUBLICATIONS

"Foreign Office Action", EP Application No. 14720018.2, dated Mar. 7, 2017, 7 pages.

"International Search Report and Written Opinion Issued in PCT Application No. PCT/US2017/051437", dated Nov. 30, 2017, 15 Pages.

"Notice of Allowance Issued in U.S. Appl. No. 15/266,520", dated Dec. 26, 2017, 16 Pages.

"Accessing Device Sensors", retrieved from <https://developer.palm.com/content/api/dev-guide/pdk/accessing-device-sensors.html> on May 25, 2012, 2011, 4 pages.

"ACPI Docking for Windows Operating Systems", Retrieved from: <http://www.scritube.com/limba/engleza/software/ACPI-Docking-for-Windows-Opera331824193.php> on Jul. 6, 2012, 2012, 10 pages.

"Adjustable Kickstand for SecureBack™ M Series Enclosures", Retrieved From: <http://www.kensington.com/ce/ca/4543/8589667786/adjustable-kickstand-for-secureback™-m-series-enclosures#.VQ_Z7_mUdT5> Mar. 25, 2015, 2012, 3 pages.

"Advanced Configuration and Power Management Specification", Intel Corporation, Microsoft Corporation, Toshiba Corp. Revision 1, Dec. 22, 1996, 364 pages.

"Advisory Action", U.S. Appl. No. 13/939,032, dated Feb. 24, 2014, 2 pages.

"Advisory Action", U.S. Appl. No. 14/199,924, dated May 28, 2014, 2 pages.

"Advisory Action", U.S. Appl. No. 14/281,905, dated Feb. 19, 2016, 3 pages.

"Basic Cam Motion Curves", Retrieved From: <http://ocw.metu.edu.tr/pluginfile.php/6886/mod_resource/content/1/ch8/8-3.htm> Nov. 22, 2013, Middle East Technical University, 1999, 14 Pages.

"Cholesteric Liquid Crystal", Retrieved from: <http://en.wikipedia.org/wiki/Cholesteric_liquid_crystal> on Aug. 6, 2012, Jun. 10, 2012, 2 pages.

"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, Jan. 2013, 1 page.

"Corrected Notice of Allowance", U.S. Appl. No. 13/470,633, dated Apr. 9, 2013, 2 pages.

"Corrected Notice of Allowance", U.S. Appl. No. 13/470,633, dated Jul. 2, 2013, 2 pages.

"Corrected Notice of Allowance", U.S. Appl. No. 13/563,435, dated Jan. 14, 2014, 2 pages.

"Corrected Notice of Allowance", U.S. Appl. No. 13/563,435, dated Mar. 20, 2014, 2 pages.

"Corrected Notice of Allowance", U.S. Appl. No. 13/563,435, dated Jan. 22, 2014, 2 pages.

"Corrected Notice of Allowance", U.S. Appl. No. 13/565,124, dated Apr. 3, 2014, 4 pages.

"Corrected Notice of Allowance", U.S. Appl. No. 13/565,124, dated Mar. 10, 2014, 2 pages.

"Corrected Notice of Allowance", U.S. Appl. No. 13/565,124, dated Apr. 14, 2014, 2 pages.

"Corrected Notice of Allowance", U.S. Appl. No. 13/651,327, dated Sep. 12, 2013, 2 pages.

"Corrected Notice of Allowance", U.S. Appl. No. 13/651,327, dated Sep. 23, 2013, 2 pages.

"Corrected Notice of Allowance", U.S. Appl. No. 13/651,726, dated Sep. 17, 2013, 2 pages.

"Corrected Notice of Allowance", U.S. Appl. No. 13/938,930, dated May 6, 2014, 2 pages.

"Corrected Notice of Allowance", U.S. Appl. No. 13/938,930, dated Jun. 6, 2014, 2 pages.

"Corrected Notice of Allowance", U.S. Appl. No. 13/939,002, dated May 22, 2014, 2 pages.

"Corrected Notice of Allowance", U.S. Appl. No. 13/939,002, dated May 5, 2014, 2 pages.

"DR2PA", retrieved from <http://www.architainment.co.uk/wp-content/uploads/2012/08/DR2PA-A U-US-size-Data-Sheet-Rev-H_LOGO.pdf> on Sep. 17, 2012, Jan. 2012, 4 pages.

"Final Office Action", U.S. Appl. No. 13/471,001, dated Jul. 25, 2013, 20 pages.

"Final Office Action", U.S. Appl. No. 13/471,139, dated Sep. 16, 2013, 13 pages.

"Final Office Action", U.S. Appl. No. 13/471,336, dated Aug. 28, 2013, 18 pages.

"Final Office Action", U.S. Appl. No. 13/564,520, dated Jan. 15, 2014, 7 pages.

"Final Office Action", U.S. Appl. No. 13/651,195, dated Apr. 18, 2013, 13 pages.

"Final Office Action", U.S. Appl. No. 13/651,232, dated May 21, 2013, 21 pages.

"Final Office Action", U.S. Appl. No. 13/651,287, dated May 3, 2013, 16 pages.

"Final Office Action", U.S. Appl. No. 13/651,976, dated Jul. 25, 2013, 21 pages.

"Final Office Action", U.S. Appl. No. 13/653,321, dated Aug. 2, 2013, 17 pages.

"Final Office Action", U.S. Appl. No. 13/653,682, dated Jun. 11, 2014, 11 pages.

(56) References Cited

OTHER PUBLICATIONS

"Final Office Action", U.S. Appl. No. 13/653,682, dated Oct. 18, 2013, 16 pages.
"Final Office Action", U.S. Appl. No. 13/656,055, dated Oct. 23, 2013, 14 pages.
"Final Office Action", U.S. Appl. No. 13/780,228, dated Mar. 28, 2014, 13 pages.
"Final Office Action", U.S. Appl. No. 13/938,930, dated Nov. 8, 2013, 10 pages.
"Final Office Action", U.S. Appl. No. 13/939,002, dated Nov. 8, 2013, 7 pages.
"Final Office Action", U.S. Appl. No. 13/939,032, dated Dec. 20, 2013, 5 pages.
"Final Office Action", U.S. Appl. No. 14/063,912, dated Apr. 29, 2014, 10 pages.
"Final Office Action", U.S. Appl. No. 14/199,924, dated May 6, 2014, 5 pages.
"Final Office Action", U.S. Appl. No. 14/281,905, dated Dec. 8, 2015, 6 pages.
"FingerWorks Installation and Operation Guide for the TouchStream ST and TouchStream LP", FingerWorks, Inc. Retrieved from <http://ec1.images-amazon.com/media/i3d/01/A/man-migrate/MANUAL000049862.pdf>, 2002, 14 pages.
"First One Handed Fabric Keyboard with Bluetooth Wireless Technology", Retrieved from: <http://press.xtvworld.com/article3817.html> on May 8, 2012, Jan. 6, 2005, 2 pages.
"Force and Position Sensing Resistors: An Emerging Technology", Interlink Electronics, Available at <http://staff.science.uva.nl/~vlaander/docu/FSR/An_Exploring_Technology.pdf>, Feb. 1990, pp. 1-6.
"Foreign Office Action", CN Application No. 201320097066.8, dated Oct. 24, 2013, 5 Pages.
"Foreign Office Action", CN Application No. 201320328022.1, dated Feb. 17, 2014, 4 Pages.
"Foreign Office Action", CN Application No. 201320328022.1, dated Oct. 18, 2013, 3 Pages.
"Frogpad Introduces Weareable Fabric Keyboard with Bluetooth Technology", Retrieved from: <http://www.geekzone.co.nz/content.asp?contentid=3898> on May 7, 2012, Jan. 7, 2005, 3 pages.
"i-Blason Spring Series Premium Flexible KickStand Anti-Slippery TPU Cover Case for iPhone 4 4S (White)", Retrieved From: <http://www.amazon.com/i-Blason-Premium-Flexible-KickStand-Anti-Slippery/dp/B007LCLXLU> Jun. 12, 2014, Nov. 30, 2012, 4 Pages.
"i-Interactor electronic pen", Retrieved from: <http://www.alibaba.com/product-gs/331004878/i_Interactor_electronic_pen.html> on Jun. 19, 2012, 2012, 5 pages.
"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 2012, 4 pages.
"International Search Report and Written Opinion", Application No. PCT/US2014/031531, dated Jun. 20, 2014, 10 Pages.
"International Search Report and Written Opinion", Application No. PCT/US2015/031271, dated Sep. 2, 2015, 10 pages.
"International Search Report and Written Opinion", Application No. PCT/US2013/028948, dated Jun. 21, 2013, 11 pages.
"International Search Report and Written Opinion", Application No. PCT/US2013/029461, dated Jun. 21, 2013, 11 pages.
"International Search Report and Written Opinion", Application No. PCT/US2013/040968, dated Sep. 5, 2013, 11 pages.
"International Search Report and Written Opinion", Application No. PCT/US2016/032242, dated Aug. 26, 2016, 12 pages.
"International Search Report and Written Opinion", Application No. PCT/US2015/052757, dated Dec. 4, 2015, 12 pages.
"International Search Report and Written Opinion", Application No. PCT/US2013/042550, dated Sep. 24, 2013, 14 pages.
"Membrane Keyboards & Membrane Keypads", Retrieved from: <http://www.pannam.com/> on May 9, 2012, Mar. 4, 2009, 2 pages.
"Motion Sensors", Android Developers—retrieved from <http://developer.android.com/guide/topics/sensors/sensors_motion.html> on May 25, 2012, 2012, 7 pages.
"MPC Fly Music Production Controller", AKAI Professional, Retrieved from: <http://www.akaiprompc.com/mpc-fly> on Jul. 9, 2012, 4 pages.
"New Friction Hinge for iPad Flip Stands", Retrieved From: http://www.nclosures.com/new-friction-hinge-design/, Jun. 18, 2013, 2 Pages.
"NI Releases New Maschine & Maschine Mikro", Retrieved from <http://www.djbooth.net/index/dj-equipment/entry/ni-releases-new-maschine-mikro/> on Sep. 17, 2012, 19 pages.
"Non-Final Office Action", U.S. Appl. No. 13/599,635, dated Feb. 25, 2014, 13 pages.
"Non-Final Office Action", U.S. Appl. No. 13/468,918, dated Dec. 26, 2013, 18 pages.
"Non-Final Office Action", U.S. Appl. No. 13/471,001, dated Feb. 19, 2013, 15 pages.
"Non-Final Office Action", U.S. Appl. No. 13/471,001, dated Jun. 17, 2014, 23 pages.
"Non-Final Office Action", U.S. Appl. No. 13/471,030, dated May 15, 2014, 10 pages.
"Non-Final Office Action", U.S. Appl. No. 13/471,054, dated Jun. 3, 2014, 15 pages.
"Non-Final Office Action", U.S. Appl. No. 13/471,139, dated Mar. 21, 2013, 12 pages.
"Non-Final Office Action", U.S. Appl. No. 13/471,186, dated Feb. 27, 2014, 8 pages.
"Non-Final Office Action", U.S. Appl. No. 13/471,202, dated Feb. 11, 2013, 10 pages.
"Non-Final Office Action", U.S. Appl. No. 13/471,237, dated Mar. 24, 2014, 7 pages.
"Non-Final Office Action", U.S. Appl. No. 13/471,336, dated Jan. 18, 2013, 14 pages.
"Non-Final Office Action", U.S. Appl. No. 13/471,336, dated May 7, 2014, 17 pages.
"Non-Final Office Action", U.S. Appl. No. 13/471,376, dated Apr. 2, 2014, 17 pages.
"Non-Final Office Action", U.S. Appl. No. 13/471,405, dated Feb. 20, 2014, 37 pages.
"Non-Final Office Action", U.S. Appl. No. 13/492,232, dated Apr. 30, 2014, 9 pages.
"Non-Final Office Action", U.S. Appl. No. 13/527,263, dated Apr. 3, 2014, 6 pages.
"Non-Final Office Action", U.S. Appl. No. 13/527,263, dated Jul. 19, 2013, 5 pages.
"Non-Final Office Action", U.S. Appl. No. 13/563,435, dated Jun. 14, 2013, 6 pages.
"Non-Final Office Action", U.S. Appl. No. 13/564,520, dated Feb. 14, 2014, 5 pages.
"Non-Final Office Action", U.S. Appl. No. 13/564,520, dated Jun. 19, 2013, 8 pages.
"Non-Final Office Action", U.S. Appl. No. 13/564,520, dated Jun. 16, 2014, 5 pages.
"Non-Final Office Action", U.S. Appl. No. 13/565,124, dated Jun. 17, 2013, 5 pages.
"Non-Final Office Action", U.S. Appl. No. 13/651,195, dated Jan. 2, 2013, 14 pages.
"Non-Final Office Action", U.S. Appl. No. 13/651,232, dated Jan. 17, 2013, 15 pages.
"Non-Final Office Action", U.S. Appl. No. 13/651,232, dated Dec. 5, 2013, 15 pages.
"Non-Final Office Action", U.S. Appl. No. 13/651,272, dated Feb. 12, 2013, 10 pages.
"Non-Final Office Action", U.S. Appl. No. 13/651,287, dated Jan. 29, 2013, 13 pages.
"Non-Final Office Action", U.S. Appl. No. 13/651,304, dated Mar. 22, 2013, 9 pages.
"Non-Final Office Action", U.S. Appl. No. 13/651,327, dated Mar. 22, 2013, 6 pages.
"Non-Final Office Action", U.S. Appl. No. 13/651,726, dated Apr. 15, 2013, 6 pages.

(56) References Cited

OTHER PUBLICATIONS

"Non-Final Office Action", U.S. Appl. No. 13/651,871, dated Mar. 18, 2013, 14 pages.
"Non-Final Office Action", U.S. Appl. No. 13/651,871, dated Jul. 1, 2013, 5 pages.
"Non-Final Office Action", U.S. Appl. No. 13/651,976, dated Feb. 22, 2013, 16 pages.
"Non-Final Office Action", U.S. Appl. No. 13/651,976, dated Jun. 16, 2014, 23 pages.
"Non-Final Office Action", U.S. Appl. No. 13/653,321, dated Feb. 1, 2013, 13 pages.
"Non-Final Office Action", U.S. Appl. No. 13/653,682, dated Feb. 7, 2013, 11 pages.
"Non-Final Office Action", U.S. Appl. No. 13/653,682, dated Feb. 26, 2014, 10 pages.
"Non-Final Office Action", U.S. Appl. No. 13/653,682, dated Jun. 3, 2013, 14 pages.
"Non-Final Office Action", U.S. Appl. No. 13/656,055, dated Mar. 12, 2014, 17 pages.
"Non-Final Office Action", U.S. Appl. No. 13/656,055, dated Apr. 23, 2013, 11 pages.
"Non-Final Office Action", U.S. Appl. No. 13/780,228, dated Oct. 30, 2013, 12 pages.
"Non-Final Office Action", U.S. Appl. No. 13/938,930, dated Aug. 29, 2013, 9 pages.
"Non-Final Office Action", U.S. Appl. No. 13/939,002, dated Aug. 28, 2013, 6 pages.
"Non-Final Office Action", U.S. Appl. No. 13/939,002, dated Dec. 20, 2013, 5 pages.
"Non-Final Office Action", U.S. Appl. No. 13/939,032, dated Aug. 29, 2013, 7 pages.
"Non-Final Office Action", U.S. Appl. No. 14/063,912, dated Jan. 2, 2014, 10 pages.
"Non-Final Office Action", U.S. Appl. No. 14/199,924, dated Apr. 10, 2014, 6 pages.
"Non-Final Office Action", U.S. Appl. No. 14/200,595, dated Apr. 11, 2014, 4 pages.
"Non-Final Office Action", U.S. Appl. No. 14/225,250, dated Jun. 17, 2014, 5 pages.
"Non-Final Office Action", U.S. Appl. No. 14/225,276, dated Jun. 13, 2014, 6 pages.
"Non-Final Office Action", U.S. Appl. No. 14/277,240, dated Jun. 13, 2014, 6 pages.
"Non-Final Office Action", U.S. Appl. No. 14/281,905, dated Mar. 24, 2016, 5 pages.
"Non-Final Office Action", U.S. Appl. No. 14/281,905, dated Jul. 10, 2015, 6 pages.
"Non-Final Office Action", U.S. Appl. No. 14/473,137, dated Jul. 14, 2016, 23 pages.
"Notice of Allowance", U.S. Appl. No. 13/468,918, dated Jun. 17, 2014, 5 pages.
"Notice of Allowance", U.S. Appl. No. 13/470,633, dated Mar. 22, 2013, 7 pages.
"Notice of Allowance", U.S. Appl. No. 13/471,139, dated Mar. 17, 2014, 4 pages.
"Notice of Allowance", U.S. Appl. No. 13/471,202, dated May 28, 2013, 7 pages.
"Notice of Allowance", U.S. Appl. No. 13/471,237, dated May 12, 2014, 8 pages.
"Notice of Allowance", U.S. Appl. No. 13/563,435, dated Nov. 12, 2013, 5 pages.
"Notice of Allowance", U.S. Appl. No. 13/565,124, dated Dec. 24, 2013, 6 pages.
"Notice of Allowance", U.S. Appl. No. 13/651,195, dated Jul. 8, 2013, 9 pages.
"Notice of Allowance", U.S. Appl. No. 13/651,232, dated Apr. 25, 2014, 9 pages.
"Notice of Allowance", U.S. Appl. No. 13/651,272, dated May 2, 2013, 7 pages.
"Notice of Allowance", U.S. Appl. No. 13/651,287, dated May 2, 2014, 6 pages.
"Notice of Allowance", U.S. Appl. No. 13/651,304, dated Jul. 1, 2013, 5 pages.
"Notice of Allowance", U.S. Appl. No. 13/651,327, dated Jun. 11, 2013, 7 pages.
"Notice of Allowance", U.S. Appl. No. 13/651,726, dated May 31, 2013, 5 pages.
"Notice of Allowance", U.S. Appl. No. 13/651,871, dated Oct. 2, 2013, 7 pages.
"Notice of Allowance", U.S. Appl. No. 13/653,321, dated Dec. 18, 2013, 4 pages.
"Notice of Allowance", U.S. Appl. No. 13/938,930, dated Feb. 20, 2014, 4 pages.
"Notice of Allowance", U.S. Appl. No. 13/939,002, dated Mar. 3, 2014, 4 pages.
"Notice of Allowance", U.S. Appl. No. 13/939,032, dated Apr. 3, 2014, 4 pages.
"Notice of Allowance", U.S. Appl. No. 14/018,286, dated May 23, 2014, 8 pages.
"Notice of Allowance", U.S. Appl. No. 14/199,924, dated Jun. 10, 2014, 4 pages.
"Notice of Allowance", U.S. Appl. No. 14/502,867, dated May 16, 2016, 14 pages.
"Notice to Grant", CN Application No. 201320097089.9, dated Sep. 29, 2013, 2 Pages.
"Notice to Grant", CN Application No. 201320097124.7, dated Oct. 8, 2013, 2 pages.
"Position Sensors", Android Developers—retrieved from <http://developer.android.com/guide/topics/sensors/sensors_position.html> on May 25, 2012, 5 pages.
"Reflex LCD Writing Tablets", retrieved from <http://www.kentdisplays.com/products/lcdwritingtablets.html> on Jun. 27, 2012, 3 pages.
"Restriction Requirement", U.S. Appl. No. 13/468,918, dated Nov. 29, 2013, 6 pages.
"Restriction Requirement", U.S. Appl. No. 13/471,139, dated Jan. 17, 2013, 7 pages.
"Restriction Requirement", U.S. Appl. No. 13/595,700, dated May 28, 2014, 6 pages.
"Restriction Requirement", U.S. Appl. No. 13/651,304, dated Jan. 18, 2013, 7 pages.
"Restriction Requirement", U.S. Appl. No. 13/651,726, dated Feb. 22, 2013, 6 pages.
"Restriction Requirement", U.S. Appl. No. 13/651,871, dated Feb. 7, 2013, 6 pages.
"Restriction Requirement", U.S. Appl. No. 14/502,867, dated Feb. 16, 2016, 7 pages.
"Second Written Opinion", Application No. PCT/US2015/031271, May 2, 2016, 5 pages.
"SMART Board™ Interactive Display Frame Pencil Pack", Available at <http://downloads01.smarttech.com/media/sitecore/en/support/product/sbfpd/400series(in teractivedisplayframes)/guides/smartboardinteractivedisplayframepencilpackv12mar09.pdf>, 2009, 2 pages.
"SoIRxTM E-Series Multidirectional Phototherapy ExpandableTM 2-Bulb Full Body Panel System", Retrieved from: < http://www.solarcsystems.com/us_multidirectional_uv_light_therapy_1_intro.html > on Jul. 25, 2012, 2011, 4 pages.
"Supplemental Notice of Allowance", U.S. Appl. No. 13/653,321, dated Mar. 28, 2014, 4 pages.
"Supplemental Notice of Allowance", U.S. Appl. No. 14/018,286, dated Jun. 11, 2014, 5 pages.
"Teach Me Simply", Retrieved From: <http://techmesimply.blogspot.in/2013/05/yugatech_3.html> on Nov. 22, 2013, May 3, 2013, pp. 1-6.
"The Microsoft Surface Tablets Comes With Impressive Design and Specs", Retrieved from <http://microsofttablereview.com/the-microsoft-surface-tablets-comes-with-impressive-design-and-specs> on Jan. 30, 2013, Jun. 2012, 2 pages.
"The New Lenovo Yoga Tablet 8", Retrieved From:<http://www.pricepanda.co.in/lenovo-yoga-tablet-8-pid1529091/> Jun. 11, 2014, 2014, 2 Pages.

(56) References Cited

OTHER PUBLICATIONS

"Tilt Shift Lenses: Perspective Control", retrieved from http://www.cambridgeincolour.com/tutorials/tilt-shift-lenses1.htm, Mar. 28, 2008, 11 Pages.

"Virtualization Getting Started Guide", Red Hat Enterprise Linux 6, Edition 0.2—retrieved from <http://docs.redhat.com/docs/en-US/Red_Hat_Enterprise_Linux/6/html-single/Virtualization_Getting_Started_Guide/index.html> on Jun. 13, 2012, 24 pages.

"Welcome to Windows 7", Retrieved from: <http://www.microsoft.com/en-us/download/confirmation.aspx?id=4984> on Aug. 1, 2013, Sep. 16, 2009, 3 pages.

"What is Active Alignment?", http://www.kasalis.com/active_alignment.html, retrieved on Nov. 22, 2012, Nov. 22, 2012, 2 Pages.

Arar, "HP Envy Rove: A Movable (If Underpowered) All-In-One PC", Retrieved From: <http://www.pcworld.com/article/2047032/hp-envy-rove-a-movable-if-underpowered-all-in-one-pc.html> Jun. 11, 2014, Aug. 21, 2013, 6 Pages.

Block, "DeviceOrientation Event Specification", W3C, Editor's Draft, retrieved from <https://developer.palm.com/content/api/devguide/pdk/accessing-device-sensors.html> on May 25, 2012, Jul. 12, 2011, 14 pages.

Brown, "Microsoft Shows Off Pressure-Sensitive Keyboard", retrieved from <http://news.cnet.com/8301-17938_105-10304792-1.html> on May 7, 2012, Aug. 6, 2009, 2 pages.

Butler, "SideSight: Multi-"touch" Interaction around Small Devices", In the proceedings of the 21st annual ACM symposium on User interface software and technology., retrieved from <http://research.microsoft.com/pubs/132534/sidesight_crv3.pdf> on May 29, 2012, Oct. 19, 2008, 4 pages.

Chavan, "Synthesis, Design and Analysis of a Novel Variable Lift Cam Follower System", In Proceedings: International Journal of Design Engineering, vol. 3, Issue 4, Inderscience Publishers, Jun. 3, 2010, 1 Page.

Crider, "Sony Slate Concept Tablet "Grows" a Kickstand", Retrieved from: <http://androidcommunity.com/sony-slate-concept-tablet-grows-a-kickstand-20120116/> on May 4, 2012, Jan. 16, 2012, 9 pages.

Das, "Study of Heat Transfer through Multilayer Clothing Assemblies: A Theoretical Prediction", Retrieved from <http://www.autexrj.com/cms/zalaczone_pliki/5_013_11.pdf>, Jun. 2011, 7 pages.

Dietz, "A Practical Pressure Sensitive Computer Keyboard", In Proceedings of UIST 2009, Oct. 2009, 4 pages.

Glatt, "Channel and Key Pressure (Aftertouch).", Retrieved from: <http://home.roadrunner.com/~jgglatt/tutr/touch.htm> on Jun. 11, 2012, 2012, 2 pages.

Hanlon, "ElekTex Smart Fabric Keyboard Goes Wireless", Retrieved from: <http://www.gizmag.com/go/5048/ > on May 7, 2012, Jan. 15, 2006, 5 pages.

Justin, "Seidio Active with Kickstand for the Galaxy SIII", Retrieved From: <http://www.t3chniq.com/seidio-active-with-kickstand-gs3/> on Nov. 22, 2013, Jan. 3, 2013, 5 Pages.

Kaur, "Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012, Jun. 21, 2010, 4 pages.

Khuntontong, "Fabrication of Molded Interconnection Devices by Ultrasonic Hot Embossing on Thin Polymer Films", IEEE Transactions on Electronics Packaging Manufacturing, vol. 32, No. 3, Jul. 2009, pp. 152-156.

Kraus, "HumanToolz Mobile Stand: A new iPad kickstand on Kickstarter", Retrieved From: www.technologytell.com/apple/100699/humantoolz-mobile-stand-a-new-ipad-kickstand-on-kickstarter, Jul. 31, 2012, 9 Pages.

Lahr, "Development of a Novel Cam-based Infinitely Variable Transmission", Proceedings: In Thesis of Master of Science in Mechanical Engineering, Virginia Polytechnic Institute and State University, Nov. 6, 2009, 91 pages.

Lambert, "Cam Design", In Proceedings: Kinematics and dynamics of Machine, University of Waterloo Department of Mechanical Engineering, Jul. 2, 2002, pp. 51-60.

Lee, "LED Light Coupler Design for a Ultra Thin Light Guide", Journal of the Optical Society of Korea, vol. 11, Issue.3, Retrieved from <http://opticslab.kongju.ac.kr/pdf/06.pdf>, Sep. 2007, 5 pages.

Linderholm, "Logitech Shows Cloth Keyboard for PDAs", Retrieved from: <http://www.pcworld.com/article/89084/logitech_shows_cloth_keyboard_for_pdas.html> on May 7, 2012, Mar. 15, 2002, 5 pages.

McLellan, "Eleksen Wireless Fabric Keyboard: a first look", Retrieved from: <http://www.zdnetasia.com/eleksen-wireless-fabric-keyboard-a-first-look-40278954.htm> on May 7, 2012, Jul. 17, 2006, 9 pages.

Post, "E-Broidery: Design and Fabrication of Textile-Based Computing", IBM Systems Journal, vol. 39, Issue 3 & 4, Jul. 2000, pp. 840-860.

Prospero, "Samsung Outs Series 5 Hybrid PC Tablet", Retrieved from: <http://blog.laptopmag.com/samsung-outs-series-5-hybrid-pc-tablet-running-windows-8> on Oct. 31, 2013, Jun. 4, 2012, 7 pages.

Purcher, "Apple Designs a Future Built-In Stand for the iPad & More", Retrieved From: <http://www.patentlyapple.com/patently-apple/2011/02/apple-designs-a-future-built-in-stand-for-the-ipad-more.html> Jun. 11, 2014, Feb. 13, 2011, 9 pages.

Purcher, "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012, Retrieved from: <http://www.patentlyapple.com/patently-apple/2012/01/apple-is-paving-the-way-for-a-new-3d-gui-for-ios-devices.html> on Jun. 4, 2012, Jan. 12, 2012, 15 pages.

Qin, "pPen: Enabling Authenticated Pen and Touch Interaction on Tabletop Surfaces", In Proceedings of ITS 2010—Available at <http://www.dfki.de/its2010/papers/pdf/po172.pdf>, Nov. 2010, pp. 283-284.

Sanap, "Design and Analysis of Globoidal Cam Index Drive", Proceedings: In International Journal of Scientific Research Engineering & Technology, Jun. 2013, 6 Pages.

Siddiqui, "Hinge Mechanism for Rotatable Component Attachment", U.S. Appl. No. 13/852,848, Mar. 28, 2013, 51 pages.

Smith, "Quirky Cloak iPad Case Review", Retrieved From: http://notebooks.com/2011/02/03/quirky-cloak-ipad-case-review/, Feb. 3, 2011, 5 Pages.

Sumimoto, "Touch & Write: Surface Computing With Touch and Pen Input", Retrieved from: <http://www.gottabemobile.com/2009/08/07/touch-write-surface-computing-with-touch-and-pen-input/> on Jun. 19, 2012, Aug. 7, 2009, 4 pages.

Takamatsu, "Flexible Fabric Keyboard with Conductive Polymer-Coated Fibers", In Proceedings of Sensors 2011, dated Oct. 28, 2011, 4 pages.

Thurrott, "Surface Pro 3: Continuous Kickstand", Retrieved From: <http://winsupersite.com/mobile-devices/surface-pro-3-continuous-kickstand> Jun. 11, 2014, May 21, 2014, 5 Pages.

Valliath, "Design of Hologram for Brightness Enhancement in Color LCDs", Retrieved from <http://www.loreti.it/Download/PDF/LCD/44_05.pdf> on Sep. 17, 2012, May 1998, 5 pages.

Williams, "A Fourth Generation of LCD Backlight Technology", Retrieved from <http://cds.linear.com/docs/Application%20Note/an65f.pdf>, Nov. 1995, 124 pages.

Zhang, "Model-Based Development of Dynamically Adaptive Software", In Proceedings of ICSE 2006, Available at <http://www.irisa.fr/lande/lande/icse-proceedings/icse/p371.pdf>, May 20, 2006, pp. 371-380.

"Notice of Allowance", U.S. Appl. No. 14/743,137, dated Apr. 18, 2017, 8 pages.

"Final Office Action", U.S. Appl. No. 14/743,137, dated Nov. 28, 2016, 25 pages.

"Notice of Allowance", U.S. Appl. No. 14/281,905, dated Sep. 23, 2016, 5 pages.

"International Preliminary Report on Patentability", Application No. PCT/US2015/031271, dated Sep. 16, 2016, 7 pages.

(56) References Cited

OTHER PUBLICATIONS

"International Preliminary Report on Patentability", Application No. PCT/US2016/032242, dated May 30, 2017, 6 pages.
"Corrected Notice of Allowance", U.S. Appl. No. 14/755,734, dated Dec. 7, 2017, 2 pages.
"Foreign Office Action", CN Application No. 201480019024.X, dated Dec. 20, 2017, 11 pages.
"International Preliminary Report on Patentability", Application No. PCT/US2016/037472, dated Aug. 23, 2017, 6 pages.
"International Preliminary Report on Patentability", Application No. PCT/US2014/031531, dated Jun. 9, 2015, 7 pages.
"International Preliminary Report on Patentability", Application No. PCT/US2015/052757, dated Sep. 5, 2016, 7 pages.
"International Search Report and Written Opinion", Application No. PCT/US2016/037472, dated Sep. 2, 2016, 11 pages.
"International Search Report and Written Opinion", Application No. PCT/US2017/024652, dated Jul. 10, 2017, 14 pages.
"Non-Final Office Action", U.S. Appl. No. 14/755,734, dated May 8, 2017, 8 pages.
"Notice of Allowance", U.S. Appl. No. 14/755,734, dated Aug. 25, 2017, 9 pages.
"Restriction Requirement", U.S. Appl. No. 14/755,734, dated Dec. 1, 2016, 6 pages.
Park,"Hinge Mechanism with Multiple Preset", U.S. Appl. No. 14/502,867, filed Sep. 30, 2014., 71 pages.
Siddiqui,"Multistage Friction Hinge", U.S. Appl. No. 14/755,734, filed Jun. 30, 2015, 50 pages.
"Foreign Office Action", JP Application No. 2016-505516, dated Feb. 6, 2018, 4 pages.
"Restriction Requirement", U.S. Appl. No. 15/091,416, dated Mar. 2, 2018, 6 pages.

\* cited by examiner even # FRICTION HINGE

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on.

Because mobile computing devices are configured to be mobile, the devices are typically designed to be used in a handheld manner. Traditional ways of adapting mobile devices for other uses (e.g., on a table or other surface) tend to be awkward and detract from the mobile aesthetic associated with mobile devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A friction hinge is described. Generally, the friction hinge provides a variable torque profile for a movable component.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

A friction hinge is described. In at least some implementations, the described friction hinge mechanism enables a support component to be adjustably attached to an apparatus, such as a computing device. For example, the hinge mechanism can be employed to rotatably attach a kickstand to a mobile computing device. The kickstand can be rotated via the hinge mechanism to various positions to provide support for different orientations of the computing device. This example is not intended to be limiting, however, and the described implementations can be used for hingeable attachment of a wide variety of different components to a wide variety of different apparatus.

According to various implementations, a hinge mechanism includes different action zones where movement of the hinge is based on different torque responses. Thus, torque response of the hinge mechanism can vary over different opening and closing angles.

In the following discussion, an example environment is first described that may employ the techniques described herein. Implementations discussed herein are not limited to the example environment, and the example environment is not limited to implementations discussed herein. Next, example device orientations are discussed in accordance with one or more implementations. Following this, example hinges for support component attachment are discussed in accordance with one or more implementations. Next, a section entitled "Hinge Responsive Profile" discusses an example torque profile for hinge movement in accordance with one or more implementations. Finally, an example system and device are discussed that may implement various techniques described herein.

Example Environment

Figure 1:
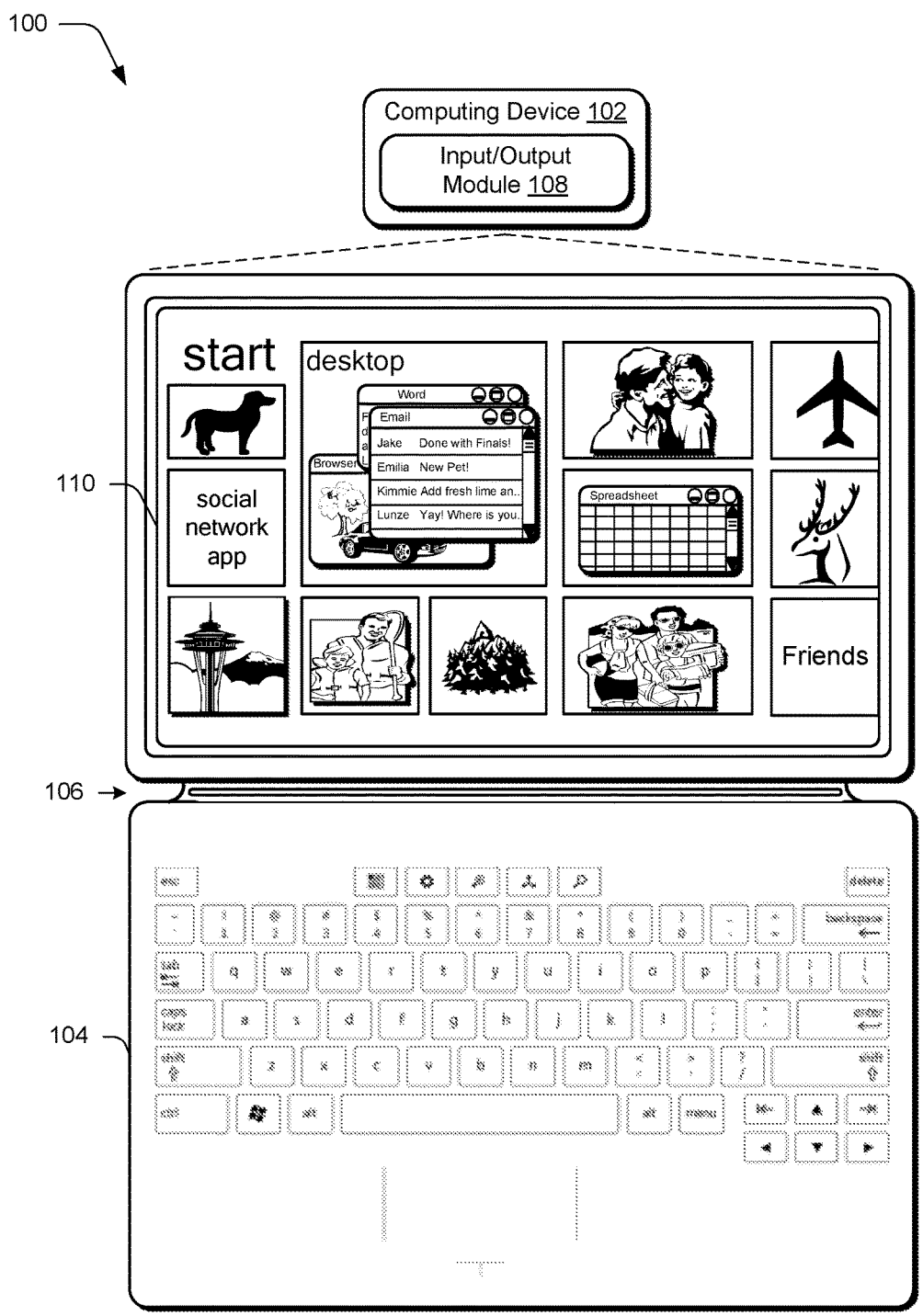
FIG. 1 is an illustration of an environment in an example implementation that is operable to employ the techniques described herein.

FIG. 1 is an illustration of an environment 100 in an example implementation that is operable to employ techniques described herein. The illustrated environment 100 includes an example of a client device 102 that is physically and communicatively coupled to an input device 104 via a flexible hinge 106. The client device 102 may be configured in a variety of ways. For example, the client device 102 may be configured for mobile use, such as a mobile phone, a tablet computer as illustrated, a wearable device, and so on.

While implementations presented herein are discussed in the context of a tablet device, it is to be appreciated that various other types and form factors of devices may be utilized in accordance with the claimed implementations. Thus, the client device 102 may range from full resource devices with substantial memory and processor resources, to a low-resource device with limited memory and/or processing resources. An example implementation of the client device 102 is discussed below with reference to FIG. 26.

The client device 102 is illustrated as including an input/output module 108, which is representative of functionality relating to processing of inputs and rendering outputs of the client device 102. A variety of different inputs may be processed by the input/output module 108, such as inputs relating to functions that correspond to keys of the input device 104, keys of a virtual keyboard displayed by the display device 110 to identify touch gestures and cause operations to be performed that correspond to the touch gestures, and so forth. Thus, the input/output module 108 may support a variety of different input techniques by recognizing and leveraging a division between types of inputs including key presses, touch gestures, touchless gestures recognized via a camera functionality of the client device 102, and so on.

In the illustrated example, the input device 104 is configured as having an input portion that includes a keyboard having a QWERTY arrangement of keys and track pad although other arrangements of keys are also contemplated. Further, other non-conventional configurations are also contemplated, such as a game controller, configuration to mimic a musical instrument, and so forth. Thus, the input device 104 and keys incorporated by the input device 104 may assume a variety of different configurations to support a variety of different functionality.

As previously described, the input device 104 is physically and communicatively coupled to the client device 102 in this example through use of a flexible hinge 106. The flexible hinge 106 is flexible in that rotational movement supported by the hinge is achieved through flexing (e.g., bending) of the material forming the hinge as opposed to mechanical rotation as supported by a pin, although that implementation is also contemplated. Further, this flexible rotation may be configured to support movement in one or more directions (e.g., vertically in the figure) yet restrict movement in other directions, such as lateral movement of the input device 104 in relation to the client device 102. This may be used to support consistent alignment of the input device 104 in relation to the client device 102, such as to align sensors used to change power states, application states, and so on.

Example Device Orientations

Figure 2:
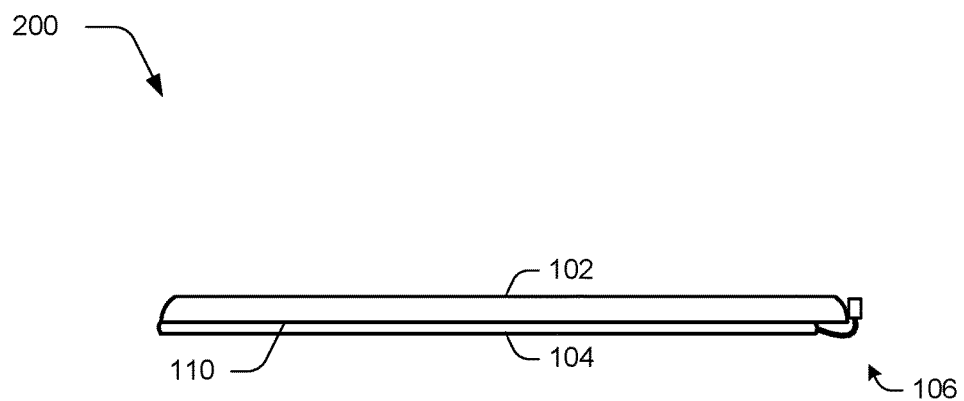
FIG. 2 illustrates an example orientation of an input device in relation to a computing device as covering a display device of the computing device.

According to various implementations, a variety of different orientations of the client device 102 are supported. For example, rotational movement of the input device is supported by the flexible hinge 106 such that the input device 104 may be placed against the display device 110 of the client device 102 and thereby act as a cover as shown in the example orientation 200 of FIG. 2. Thus, the input device 104 may act to protect the display device 110 of the client device 102 from harm.

Figure 3:
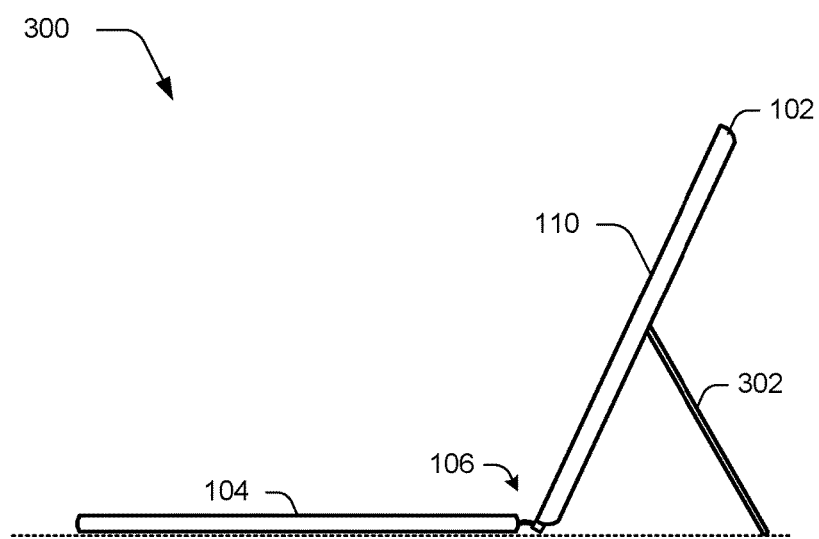
FIG. 3 illustrates an example orientation of an input device in relation to a computing device as assuming a typing orientation.

As shown in the example orientation 300 of FIG. 3, a typing arrangement may be supported. In this orientation, the input device 104 is laid flat against an adjacent surface (e.g., a desk, a table, and so forth) and the client device 102 is disposed at an angle to permit viewing of the display device 110, e.g., such as through use of a kickstand 302 disposed on a rear surface of the client device 102. According to various implementations, the kickstand 302 serves as a support component to enable a variety of different orientations for the client device 102, some of which are described herein. Naturally, a variety of other orientations other than those expressly illustrated and discussed herein are also supported. Generally, the kickstand 302 is held in position via a friction hinge, examples of which are detailed below.

Figure 4:
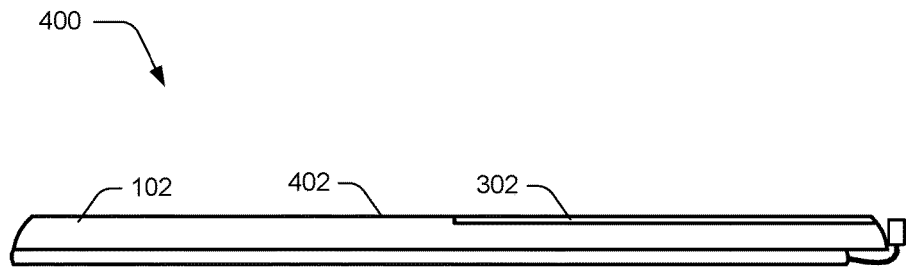
FIG. 4 illustrates an example orientation of a computing device with a support component.

FIG. 4 illustrates a position 400 which represents the kickstand 302 in a closed position. In the closed position, the kickstand 302 forms a portion of a rear surface 402 of the client device 102 such that the kickstand 302 conforms to a surface contour of the client device 102. For instance, when the kickstand 302 is in the closed position, the kickstand 302 integrates into the client device 102 and does not protrude from a plane formed by the rear surface 402.

Figure 5:
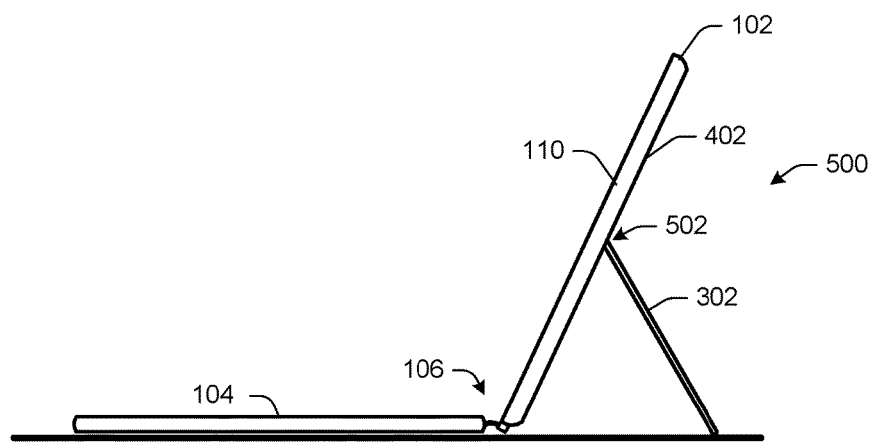
FIG. 5 illustrates an example orientation of a computing device with a support component.

FIG. 5 illustrates that the kickstand 302 can be rotated away from the rear surface 402 of the client device 102 to a position 500. For instance, the kickstand 302 can be rotatably attached to the client device 102 along a seam 502 via a hinge mechanism. Examples of such a hinge mechanism are detailed below.

The position 500 enables a variety of different usage scenarios, such as by allowing the display device 110 to be viewed and input to be provided to the client device 102 via the input device 104. Alternatively or additionally, the position 500 enables a user to interact with a touchscreen of the client device 102.

Figure 6:
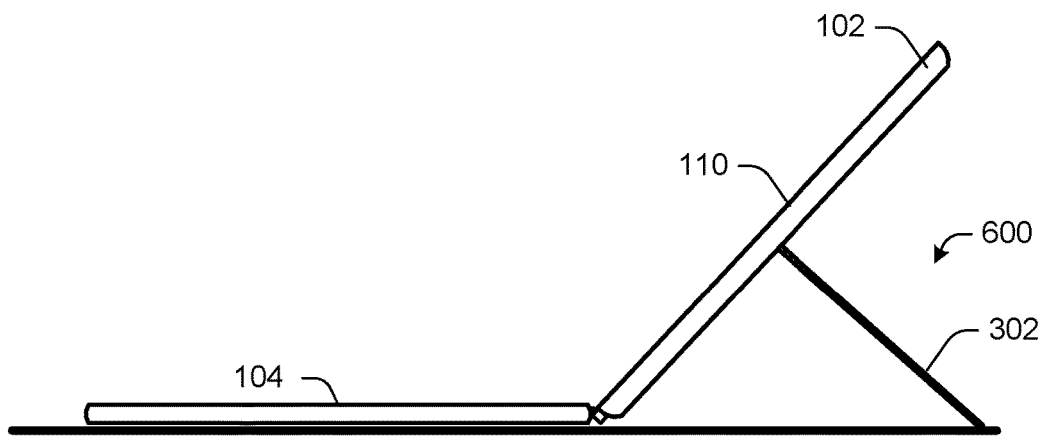
FIG. 6 illustrates an example orientation of a computing device with a support component.

FIG. 6 illustrates that the kickstand 302 can be rotated further past the position 500 to a position 600. In the position 600, the computing device is reclined in comparison to previously-discussed orientations, such as the position 500. As illustrated, the position 600 presents the display device 110 at a more open angle that supports different usage scenarios. For instance, the position 600 supports use of the client device 102 in a user's lap, such as during air travel. A variety of other usage scenarios are supported by the position 600, such as for tall users that may have a higher viewing angle, use on a low surface (e.g., a coffee table), and so forth.

Figure 7:
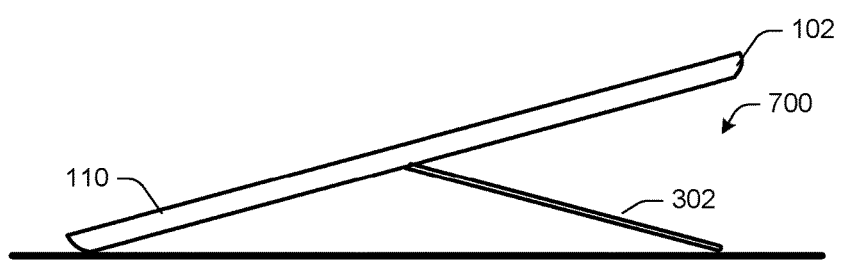
FIG. 7 illustrates an example orientation of a computing device with a support component.

FIG. 7 illustrates that the kickstand 302 can be rotated further from the position 600 to a position 700. FIG. 7 also depicts that the input device 104 is detached from the client device 102. As discussed above, the input device 104 is removably attached to the computing device 104 to support a variety of different usage scenarios.

Figure 8:
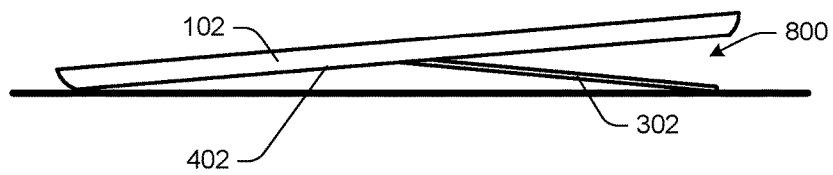
FIG. 8 illustrates an example orientation of a computing device with a support component.

FIG. 8 illustrates that the kickstand 302 can be rotated further away from the rear surface 402 of the client device 102 to a position 800. For instance, the kickstand 302 can be rotated further past the position 700 to the position 800. Generally, the kickstand 302 is held in the position 800 via a friction hinge, examples of which are detailed below.

In at least some implementations, the position 800 represents maximum open position for the kickstand 302. A hinge mechanism that attaches the kickstand 302 to the client device 102, for example, will not open further past the position 800.

Figure 9:
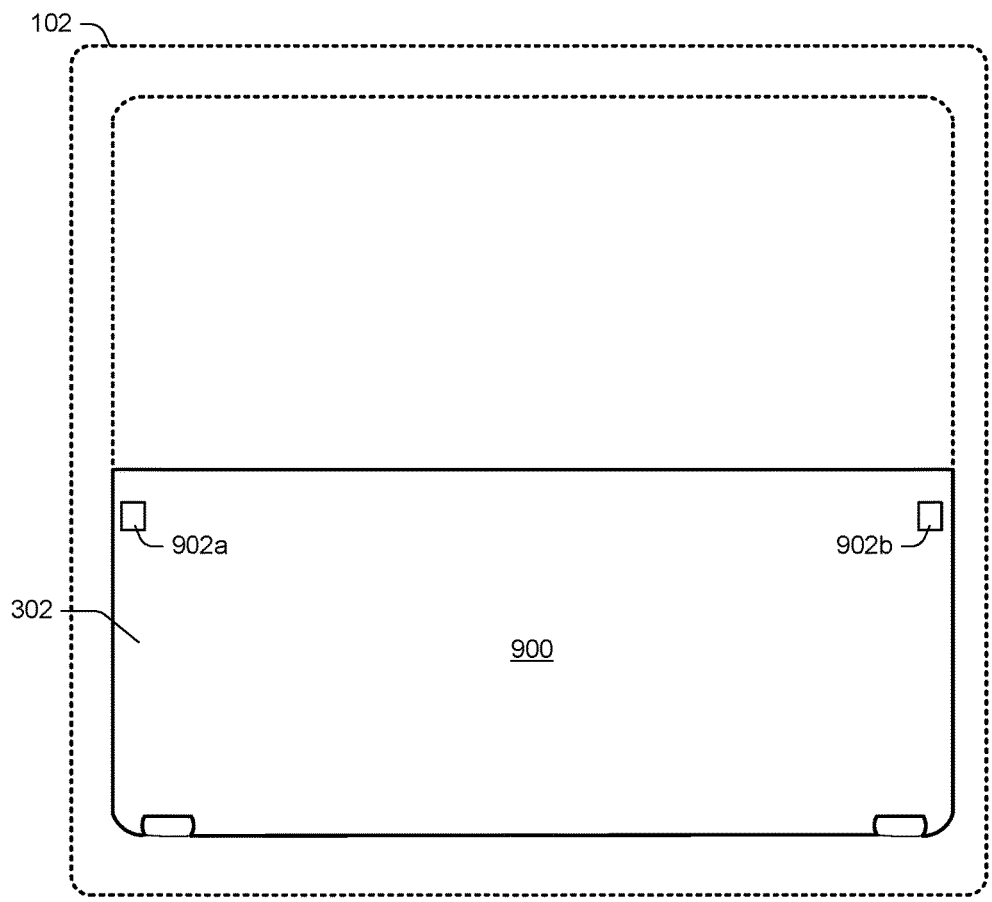
FIG. 9 illustrates an example inner surface of a support component.

FIG. 9 illustrates a view of an inner surface 900 of the kickstand 302. In this example, the kickstand 302 is illustrated in the context of an outline of a chassis of the client device 102, indicated via dashed lines. The inner surface 900 includes hinge mounts 902a, 902b, which function as mounting points for hinge mechanisms that are employed to attach the kickstand 302 to the client device 102. Examples of such hinge mechanisms are discussed below.

Hinges for Component Attachment

A variety of different hinge mechanisms can be employed for attaching various components in accordance with various implementations. Some example hinge mechanisms and hinge arrangements are discussed below.

Figure 10:
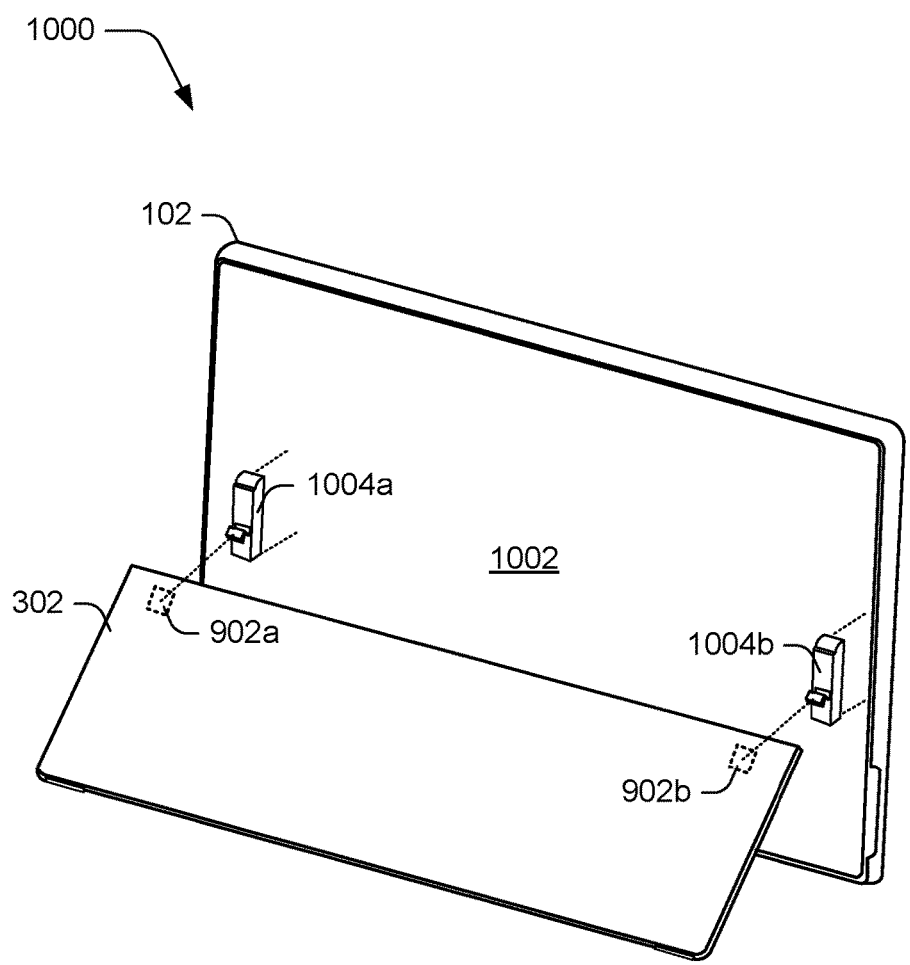
FIG. 10 illustrates an example exploded view of a computing device with a support component.

FIG. 10 illustrates an exploded rear view 1000 of a chassis 1002 of the client device 102 and the kickstand 302. Included in the rear view 1000 are hinges 1004a and 1004b, which are employed to attach the kickstand 302 to the client device 102. The hinges 1004a, 1004b are configured to be installed internally in the client device 102, such as via a suitable attachment method and/or device.

The kickstand 302 can be attached to a pivoting portion of the hinges 1004a, 1004b via the hinge mounts 902a, 902b. Thus, attachment to the hinges 1004a, 1004b enables the kickstand 302 to pivot between various positions relative to the client device 102.

Figure 11:
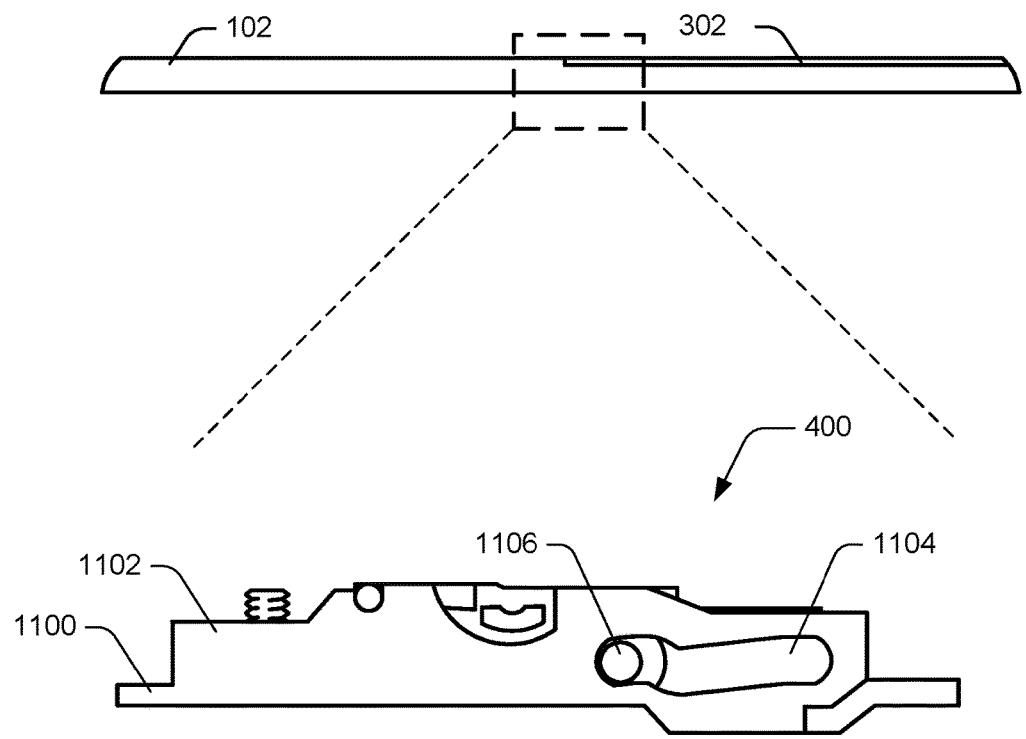
FIG. 11 depicts a side view of an example hinge.

FIG. 11 depicts a side view of an example hinge 1100. The hinge 1100, for instance, represents an implementation of the hinges 1004a, 1004b discussed above. This is not intended to be limiting, however, and the hinge 1100 can be employed as a hinge mechanism for a variety of different components and in a variety of different attachment scenarios. The hinge 1100 and its various components can be formed using any suitable material and/or combination of materials, such as metals, plastics, polymers, alloys, and so forth. Generally, the view depicted in FIG. 11 represents the hinge 1100 in a closed position, such as the position 400 depicted in FIG. 4.

The hinge 1100 includes a hinge frame 1102 in which various components of the hinge 1100 are disposed. For example, the hinge frame 1102 can be mounted to and/or within a device (e.g., the chassis 1002 of the client device 102) and function as a support structure for other components of the hinge 1100.

The hinge frame 1102 includes a guide slot 1104 in which a guide pin 1106 is positioned. The guide slot 1104 represents a perforation in a side of the hinge frame 1102. A further detailed below, interaction of the guide pin 1106 with the guide slot 1104 affects resistance to movement of the hinge 1100 to different positions.

Figure 12:
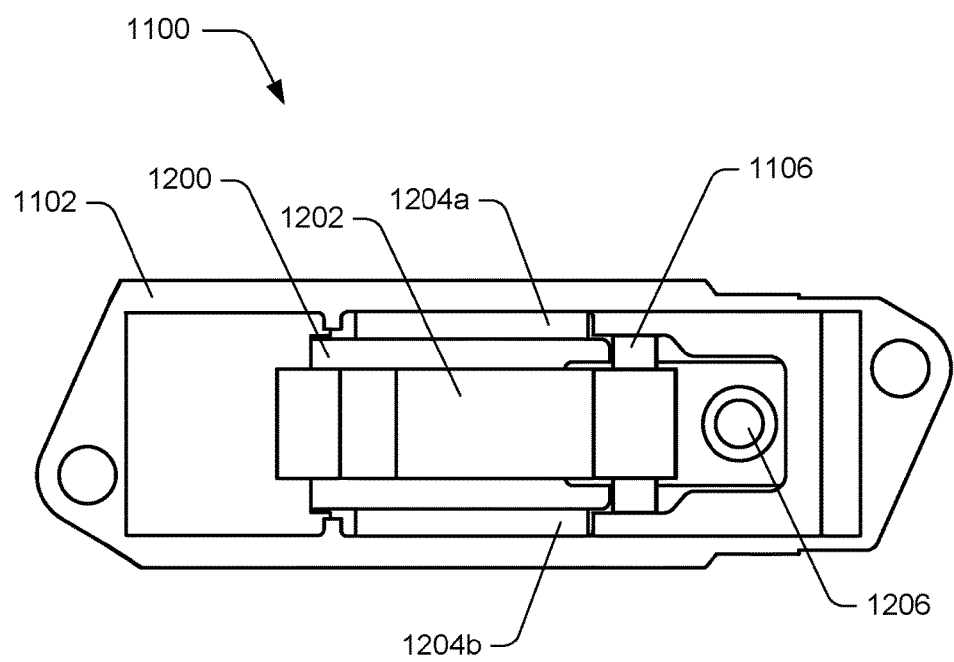
FIG. 12 depicts an overhead view of an example hinge.

FIG. 12 depicts an overhead view of the hinge 1100 in accordance with one or more implementations. Generally, the view depicted in FIG. 12 represents the hinge 1100 in a closed position, such as the position 400 depicted in FIG. 4. The overhead view illustrates the hinge frame 1102, a pivot member 1200, a hinge band 1202, and the guide pin 1106. According to various implementations, the pivot member 1200 is pivotably engaged within the hinge frame 1102 to enable the pivot member 1200, and thus an attached component (e.g., the kickstand 302) to pivot between various positions. Notice that the hinge band 1202 is positioned at least partially within the pivot member 1200. As further detailed below, when the hinge 1100 is moved between various positions, the hinge band 1202 pivots relative to the pivot member 1200.

Further depicted are a support plate 1204a, a support plate 1204b, and a component mount 1206. As further detailed below, the support plates 1204a, 1204b provide support for the pivot member 1200 when the hinge 1100 is in various open positions. While implementations are discussed herein with reference to two support plates, it is to be appreciated that alternative implementations may utilize a single support plate (e.g., one of support plate 1204a or 1204b) within the spirit and scope of the claimed implementations.

The component mount 1206 represents a portion of the pivot member 1200 that is attachable to a component. For instance, the component mount 1206 is leveraged to attach the pivot member 1200, and thus the hinge 1100, to the kickstand 302. In this implementation, the component mount 1206 includes a mounting hole through which a mounting mechanism such as a screw, a bolt, a rivet, and so forth, can be placed to attach the pivot member 1200 to a component.

Figure 13:
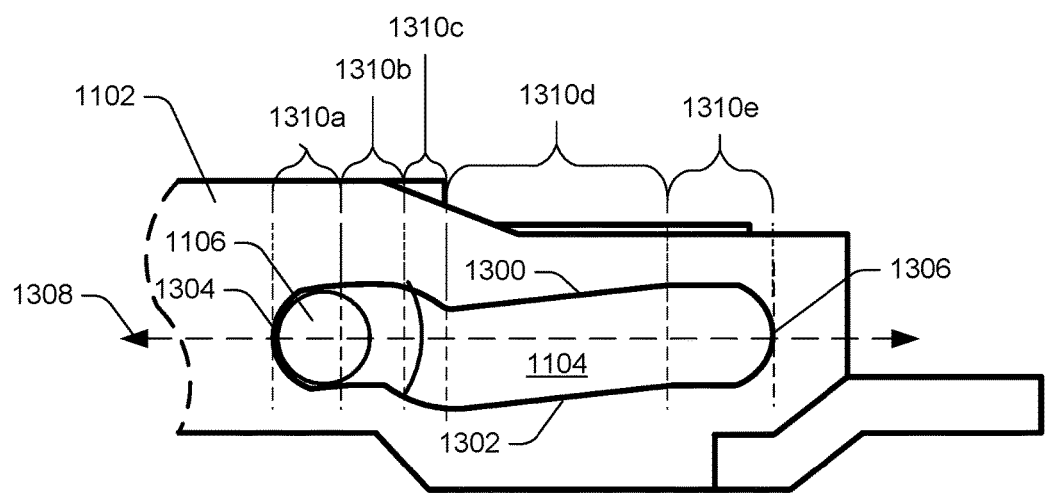
FIG. 13 depicts a section view of a hinge frame.

FIG. 13 depicts a section view of the hinge frame 1102 including the guide slot 1104. The guide slot 1104 includes a first edge 1300, a second edge 1302, a first end 1304, and a second end 1306. Generally, the profile and orientation of the guide slot 1104 affects movement of the guide pin 1106 through the guide slot 1104, and thus affects a torque response of the hinge 1100. The profile of the guide slot 1104, for instance, is determined based on respective angles of the first edge 1300 and the second edge 1302 relative to a longitudinal axis 1308 of the hinge frame 1102. Accordingly, FIG. 13 illustrates that the guide slot 1104 is divided into different action zones ("zones") that affect a torque response of the hinge 1100 in various ways. In this example, the guide slot 1104 includes a zone 1310a, a zone 1310b, a zone 1310c, a zone 1310d, and a zone 1310e. These particular zones are presented for purpose of example only, and it is to be appreciated that implementations for friction hinge can utilize any number and/or configuration of action zones.

According to various implementations, each of the zones 1310a-1310e can be characterized with reference to the respective angles of the first edge 1300 and the second edge 1302 relative to the longitudinal axis 1308 within each zone. Hereinafter, the respective angles of the first edge 1300 and the second edge 1302 relative to the longitudinal axis 1308 is referred to as the "slot angle" within each zone. As further detailed below, the slot angle within the different zones affects a torque response of the hinge 1100.

Figure 14:
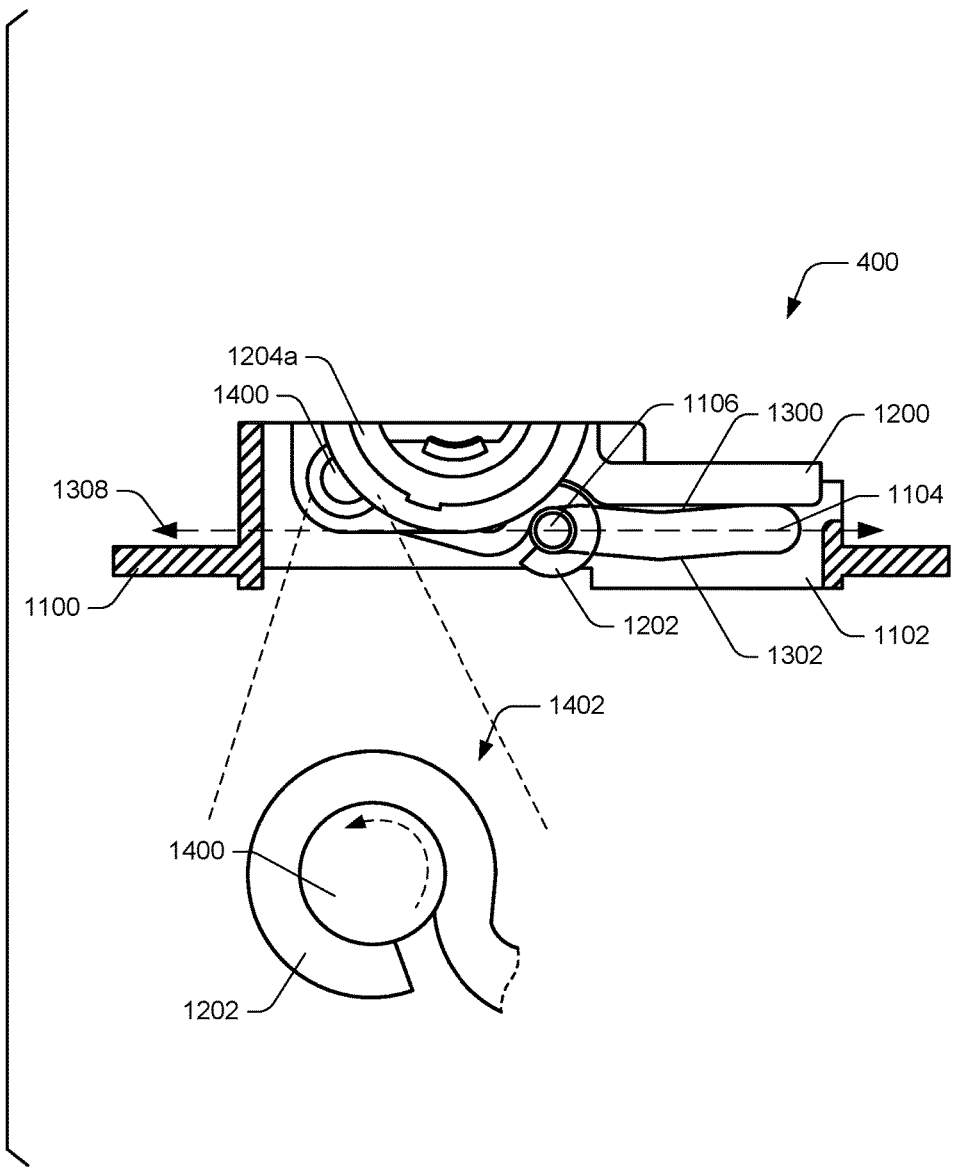
FIG. 14 depicts a side cutaway view of an example hinge.

FIG. 14 depicts a side cutaway view of the hinge 1100 in accordance with one or more implementations. Generally, the view depicted in FIG. 14 represents the hinge 1100 in a closed position, such as the position 400 depicted in FIG. 4. The side cutaway view illustrates the hinge frame 1102 with various other components of the hinge 1100, including the pivot member 1200 and the hinge band 1202. According to various implementations, the pivot member 1200 represents a portion of the hinge 1100 to which a moveable component can be attached. For instance, the kickstand 302 can be attached to the pivot member 1200 to enable pivoting movement of the kickstand 302 relative to the client device 102.

As illustrated, the guide pin 1106 is positioned partially within the hinge band 1202. For instance, the hinge band 1202 at least partially wraps around the guide pin 1106. In at least some implementations, the guide pin 1106 is fastened to the hinge band 1202, such as via pressing, welding, adhesive, and so forth. As yet another alternative implementation, the guide pin 1106 may be implemented as an integrated feature of the hinge band 1202 such that the hinge band 1202 and the guide pin 1106 are formed from a single piece of material. In at least some implementations, the guide pin 1106 does not rotate relative to the hinge band 1202. For instance, rotation of the hinge band 1202 causes a corresponding rotation of the guide pin 1106.

Alternatively, the guide pin 1106 may be rotatably positioned within the hinge band 1202 such that the guide pin 1106 may rotate relative to the hinge band 1202.

Further depicted in FIG. 14 are the support plate 1204a along with a friction pin 1400 positioned within the pivot member 1200. According to various implementations, the friction pin 1400 represents a cylindrical element that is fixed to the pivot member 1200 and does not rotate relative to the pivot member 1200 when the pivot member 1200 pivots between various positions. The friction pin 1400, for instance, is pressed into and/or fastened within the pivot member 1200. Alternatively, the friction pin 1400 represents a structural feature of the pivot member 1200, e.g., is formed from a same piece of material as the pivot member 1200.

The lower portion of FIG. 14 depicts an enlarged view of a side cutaway 1402 of a portion of the hinge 1100, showing the friction pin 1400 engaged with the hinge band 1202. The side cutaway 1402, for instance, represents a portion of a vertical cross section of the hinge 1100. As shown, the friction pin 1400 is rotatably engaged within the hinge band 1202. According to various implementations, the physical interface between the friction pin 1400 and the hinge band 1202 provides resistance to pivoting of the pivot member 1200 relative to the hinge frame 1102, and thus resistance to movement of a component that is attached to the pivot member 1200, such as the kickstand 302.

For instance, the hinge band 1202 at least partially wraps around the friction pin 1400 at an opposite end of the hinge band 1202 from the guide pin 1106. The friction pin 1400, for example, is pressed into the hinge band 1202 and may rotate relative to the hinge band 1202. As further depicted in subsequent figures, the friction pin 1400 moveably fastens the hinge band 1202 to the pivot member 1200, and contributes to a torque profile of the hinge 1100 when the hinge 1100 is moved between various positions.

Generally, these different components of the hinge 1100 interact during movement of the hinge 1100 to provide a particular responsiveness profile over different hinge positions. These and other components of the hinge 1100 are detailed in subsequent figures and discussion.

According to various implementations, the frictional interface between the friction pin 1400 and the hinge band 1202 keeps the pivot member 1200 in a closed position and provides a certain amount of resistance to opening of the hinge 1100. For instance, resistance to rotation of the friction pin 1400 relative to the hinge band 1202 prevents the kickstand 302 from sagging relative to the client device 102, and provides resistance to opening of the kickstand 302 from a closed position.

As discussed herein, "opening" of the kickstand 302 and/or the hinge 1100 refers to a movement of the kickstand 302 and/or the hinge 1100 away from a closed position (e.g., the position 400) toward an open position. Further, "closing" of the kickstand 302 and/or the hinge 1100 refers to a movement of the kickstand 302 and/or the hinge 1100 from an open position toward a closed position, e.g., toward the position 400.

As illustrated in this implementation, the hinge band 1202 does not fully enclose the friction pin 1400. Accordingly, when the friction pin 1400 rotates in response to the pivot member 1200 pivoting in an opening direction, friction at the interface between the friction pin 1400 and the hinge band 1202 causes the hinge band 1202 to tighten around the friction pin 1400, thus contributing to the torque profile of the hinge 1100 when the hinge 1100 is opened. Further, when the pivot member 1200 is pivoted toward a closed position, friction between the friction pin 1400 and the hinge band 1202 tends to open the hinge band 1202 relative to the friction pin 1400, thus contributing to the torque profile of the hinge 1100 when the hinge 1100 is closed. In at least some implementations, tightening of the hinge band 1202 around the friction pin 1400 when the hinge 1100 is moved in an opening direction results in greater friction between the hinge band 1202 and the friction pin 1400 than when the hinge 1100 is moved in a closing direction.

According to various implementations, when the hinge 1100 pivots in in an opening direction, the guide pin 1106 presses against the first edge 1300 of the guide slot 1104 as the guide pin 1106 moves through the guide slot 1104. Accordingly, the slot angle of the guide slot 1104 for purposes of determining torque response of the hinge 1100 when moving in an opening direction is primarily based on the angle of the first edge 1300 relative to the longitudinal axis 1308 of the hinge frame 1102. However, when the hinge 1100 pivots in a closing direction, the guide pin 1106 presses against the second edge 1302 of the guide slot 1104 as the guide pin 1106 moves through the guide slot 1104. Accordingly, the slot angle of the guide slot 1104 for purposes of determining torque response of the hinge 1100 when moving in a closing direction is primarily based on the angle of the second edge 1302 relative to the longitudinal axis 1308 of the hinge frame 1102.

Figure 15:
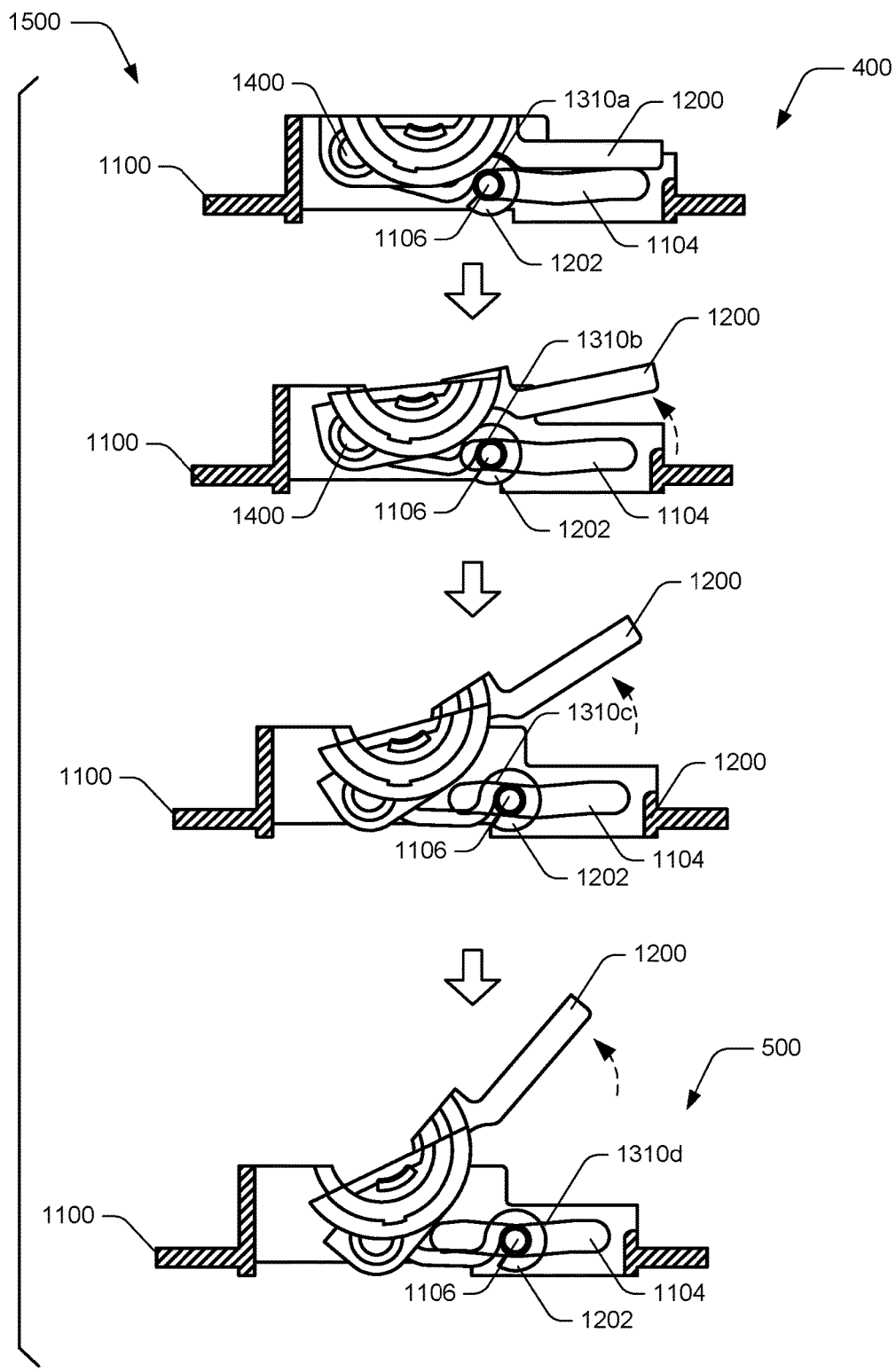
FIG. 15 depicts an implementation scenario for opening of a hinge.

FIG. 15 depicts an implementation scenario 1500 for opening of the hinge 1100 in accordance with one or more implementations. The depictions of the hinge 1100 in the scenario 1500 show a side cutaway view of the hinge 1100.

In the upper portion of the scenario 1500, the hinge 1100 is in a closed position, such as the position 400. Proceeding towards the lower portion of the scenario 1500, the hinge 1100 is opened. For instance, a user manipulates an attached component (e.g., the kickstand 302) from a closed position to various open positions. Notice that as the hinge 1100 opens, the pivot member 1200 pivots relative to the hinge frame 1102. Further, the friction pin 1400 pushes the hinge band 1202 forward, which causes the guide pin 1106 to move forward within the guide slot 1104.

During movement of the hinge band 1202 and the guide pin 1106, the friction pin 1400 rotates relative to the hinge band 1202. As mentioned above, frictional resistance to rotation of the friction pin 1400 relative to the hinge band 1202 provides torque resistance to pivoting of the pivot member 1200. Generally, the torque resistance to pivoting of the pivot member 1200, and thus an attached component, is referred to as the "torque output" of the hinge 1100.

According to various implementations, the frictional force between the friction pin 1400 and the hinge band 1202 is substantially constant in a particular direction, e.g., an opening direction or a closing direction. However, the torque output of the hinge 1100 is variable across movement in a particular direction based on the geometry of the hinge 1100, such as the location of the friction pin 1400 relative to the pivot member 1200, the vertical position of the guide slot 1104 on the hinge frame 1102, the length of the hinge band 1202, and so forth. The torque output of the hinge 1100, however, can be fine-tuned by varying the slot angle of the guide slot 1104. For instance, movement of the guide pin 1106 through the different zones 1310a-1310e of the guide slot 1104 changes the angle of the hinge band 1202 relative to the friction pin 1400 due to the variation in the slot angle of the guide slot 1104 across the different zones 1310a-1310e. This variation in the slot angle and the resulting variation in the angle of the hinge band 1202 relative to the friction pin 1400 causes variations in an amount of rotation of the friction pin 1400 relative to the hinge band 1202.

For instance, movement of the guide pin 1106 from the zone 1310a to the zone 1310b requires less rotation of the friction pin 1400 relative the hinge band 1202 than does movement of the guide pin 1106 from the zone 1310b to the zone 1310c. Although the frictional force of between the friction pin 1400 and the hinge band 1202 is substantially constant in a particular direction, increasing the amount of rotation of the friction pin 1400 relative to the hinge band 1202 results in a higher output torque for movement from the zone 1310b to the zone 1310c, than for movement from the zone 1310a to the zone 1310b since more rotation of the friction pin 1400 is required to move the guide pin 1106 from the zone 1310b to the zone 1310c, than from the zone 1310a to the zone 1310b. Movement between the other zones of the guide slot 1104 also causes changes in the torque output of the hinge 1100, an example of which is demonstrated via the torque curves presented in FIG. 25.

Continuing through the different positions of the hinge 1100 to the lower portion of the scenario 1500, the hinge 1100 is opened to the position 500 introduced with reference to FIG. 5.

Figure 16:
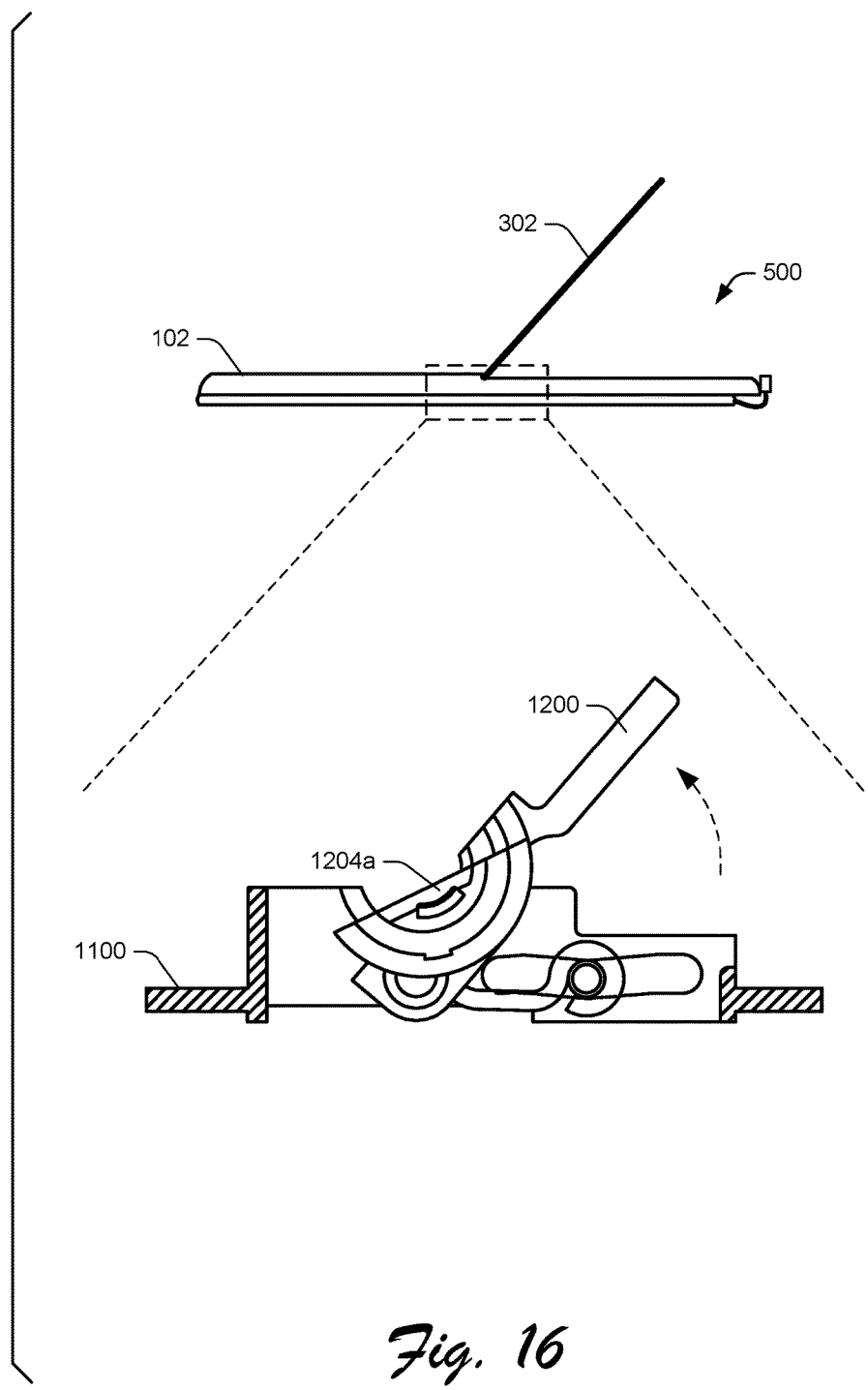
FIG. 16 depicts a side view of an example hinge.

FIG. 16 depicts a side view of the hinge 1100 opened to the position 500 in accordance with one or more implementations. For instance, a user manipulates the kickstand 302 from the position 400 (e.g., a closed position relative to the client device 102) to the open position 500. Shown here is the client device 102, the kickstand 302, along with different components of the hinge 1100 introduced above.

According to various implementations, the torque response of the hinge 1100 is such that absent externally applied force, the hinge 1100 and thus an attached component will not pivot. For instance, unless a user or other external entity applies external force to the kickstand 302, the hinge 1100 will remain statically positioned in the position 500.

FIG. 16 further illustrates that in response to movement of the pivot member 1200 to the position 500, the support plate 1204a moves along with the pivot member 1200 and partially protrudes from the hinge frame 1102. Frictional interaction between the pivot member 1200 and the support plate 1204a, for instance, causes the support plate 1204a to move such that when the pivot member 1200 is moved to an open position, the support plate 1204a moves along with the pivot member 1200. This is not intended to be limiting, however, and in some implementations the support plate 1204a does not move with the pivot member 1200 until a catch feature of the pivot member 1200 (discussed below) engages with the support plate 1204a. Although various features and behaviors are discussed herein with reference to a particular instance of the support plates 1204a, 1204b, it is to be appreciated that similar features may apply to both instances of the support plates 1204a, 1204b.

Figure 17:
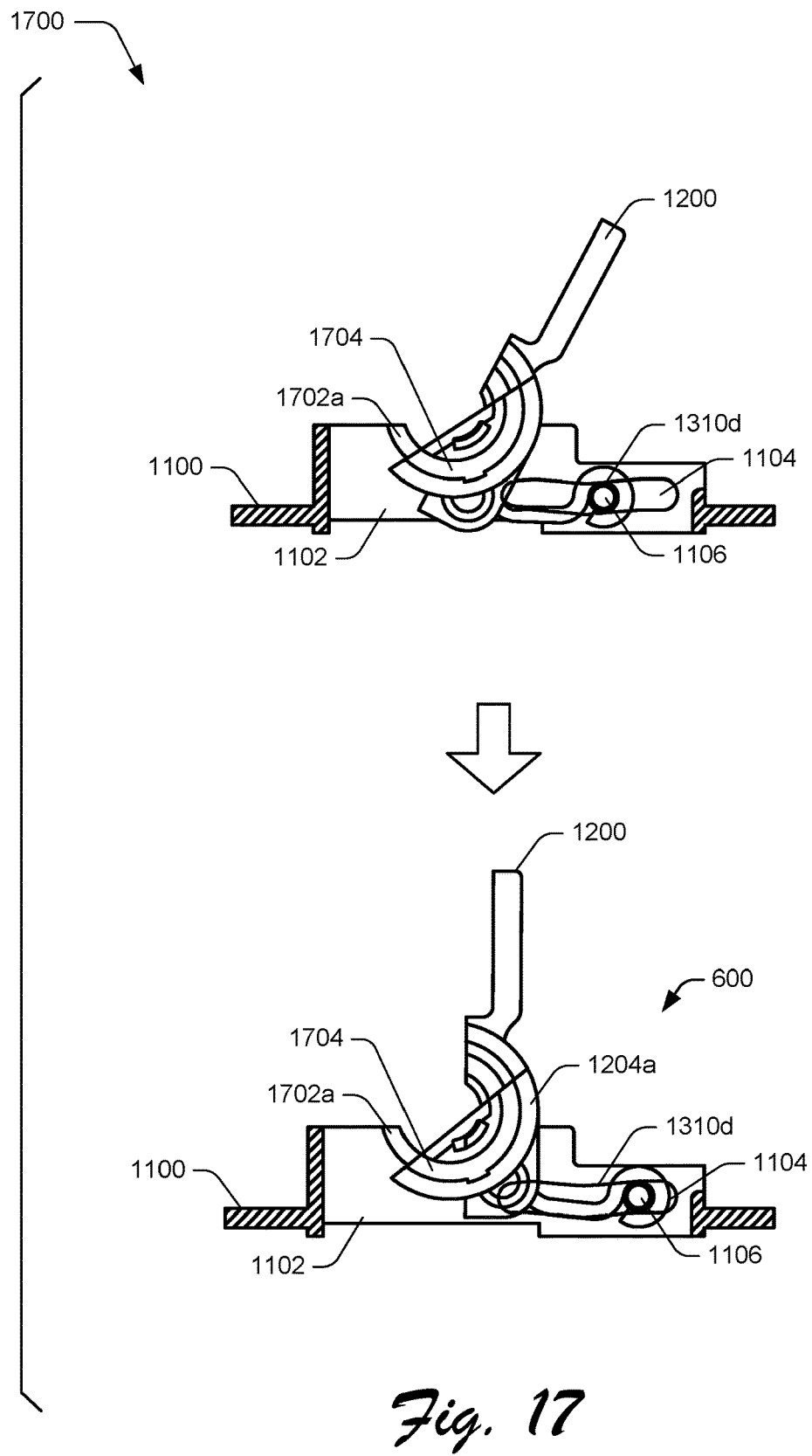
FIG. 17 depicts an implementation scenario for opening of a hinge.

FIG. 17 depicts an implementation scenario 1700 for further opening of the hinge 1100 in accordance with one or more implementations. The depictions of the hinge 1100 in the scenario 1500 show a side cutaway view of the hinge 1100. In at least some implementations, the scenario 1700 represents a continuation of the scenario 1500, described above.

In the scenario 1700, the hinge 1100 is opened to the position 600, introduced above with reference to FIG. 6. Notice that as the pivot member 1200 pivots further open relative to the hinge frame, the support plate 1204a pivots along with the pivot member 1200. Accordingly, the hinge frame 1102 includes a support guide 1702a, which represents an arcuate protrusion on the inner surface of the hinge frame 1102 that engages with the support plate 1204a and guides rotation of the support plate 1204a relative to the hinge frame 1102. A plate slot 1704 of the support plate 1204a, for instance, engages with the support guide 1702a to control movement of the support plate 1204a when the pivot member 1200 is pivoted between various positions.

During movement of the hinge 1100 in the scenario 1700, the guide pin 1106 traverses through the zone 1310d of the guide slot 1104. The slot angle of the zone 1310d is such that the torque output of the hinge 1100 gradually increases as the guide pin 1106 traverses through the zone 1310d. This increase in torque output is generally caused due to an increase in rotational velocity of the friction pin 1400 relative to the hinge band 1202 across the zone 1310d.

Figure 18:
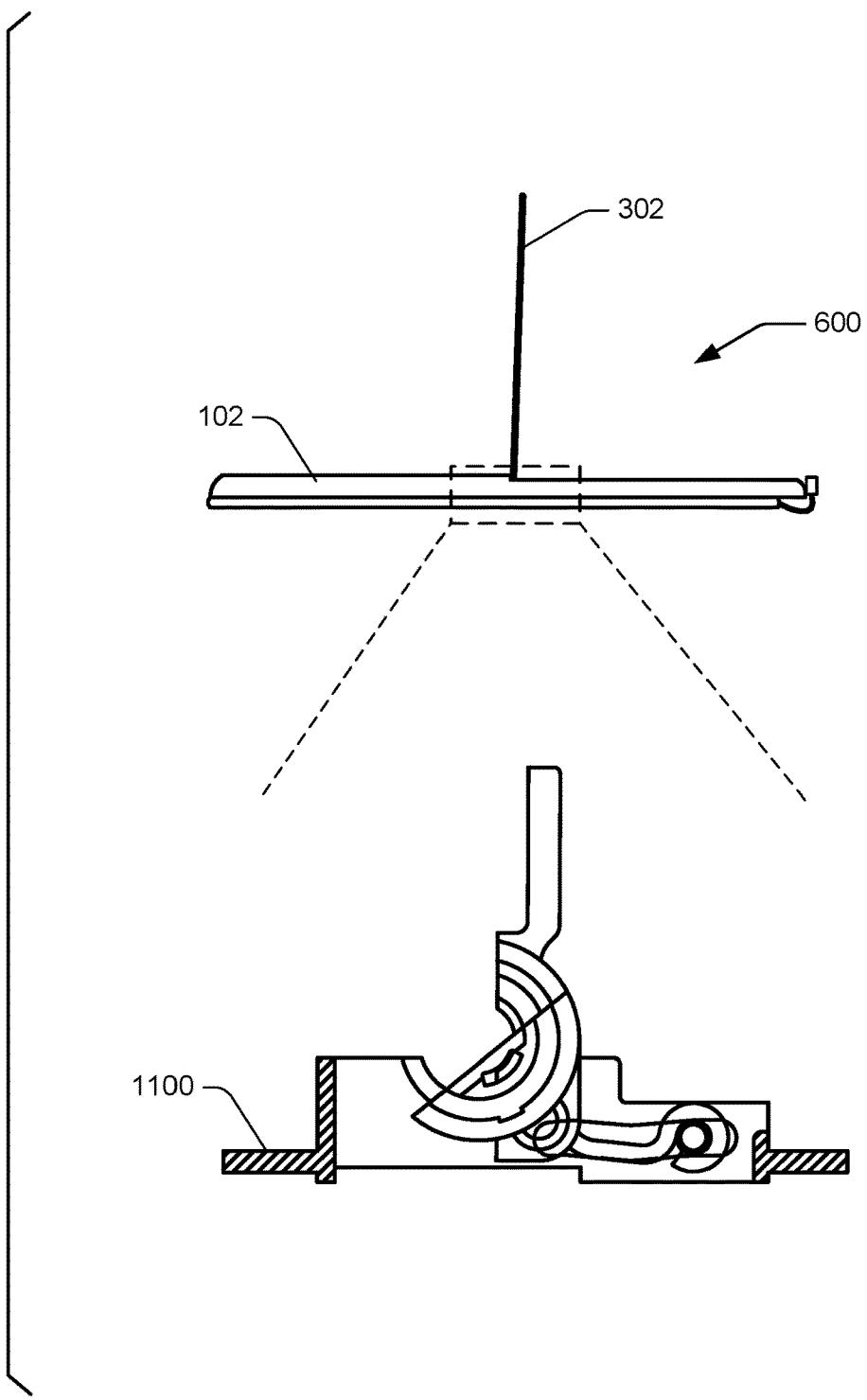
FIG. 18 depicts a side cutaway view of an example hinge.

FIG. 18 depicts a side cutaway view of the hinge 1100 opened to the position 600 in accordance with one or more implementations. For instance, a user manipulates the kickstand 302 from the open position 500 to the position 600 relative to the client device 102, such as introduced with reference to FIG. 6.

Figure 19:
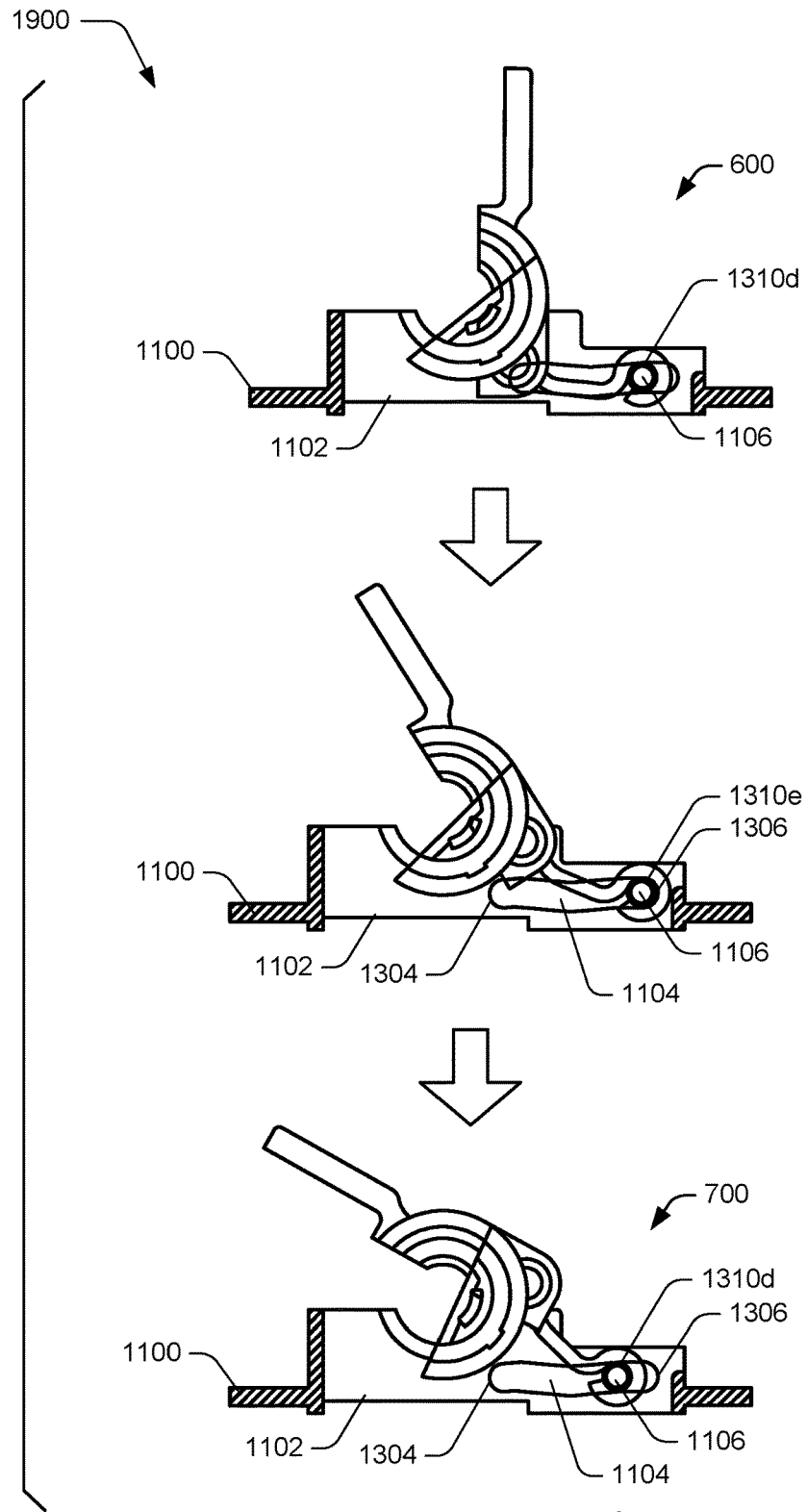
FIG. 19 depicts an implementation scenario for opening of a hinge.

FIG. 19 depicts an implementation scenario 1900 for further opening of the hinge 1100 in accordance with one or more implementations. The depictions of the hinge 1100 in the scenario 1500 show a side cutaway view of the hinge 1100. In at least some implementations, the scenario 1900 represents a continuation of the scenarios 1500, 1700 described above.

In the scenario 1900, the hinge 1100 is opened further past the position 600 to the position 700. Notice that in the center portion of the scenario 1900, the guide pin 1106 reaches the second end 1306 of the guide slot 1104. The guide pin 1106, for instance, moves from the zone 1310d to the zone 1310e. As the hinge 1100 opens further to the position 700 in the lower portion of the scenario 1900, the guide pin 1106 begins moving back toward the first end 1304 of the guide slot 1104. For instance, the guide pin 1106 moves from the zone 1310e back to the zone 1310d. Accordingly, the amount of rotation of the friction pin 1400 relative to the hinge band 1202 when the hinge 1100 moves to the position 700 is determined by the slot angle of the guide slot 1104 as the guide pin moves from the zone 1310e to the zone 1310d. This amount of rotation determines the torque output of the hinge 1100 as the hinge moves to the position 700.

Figure 20:
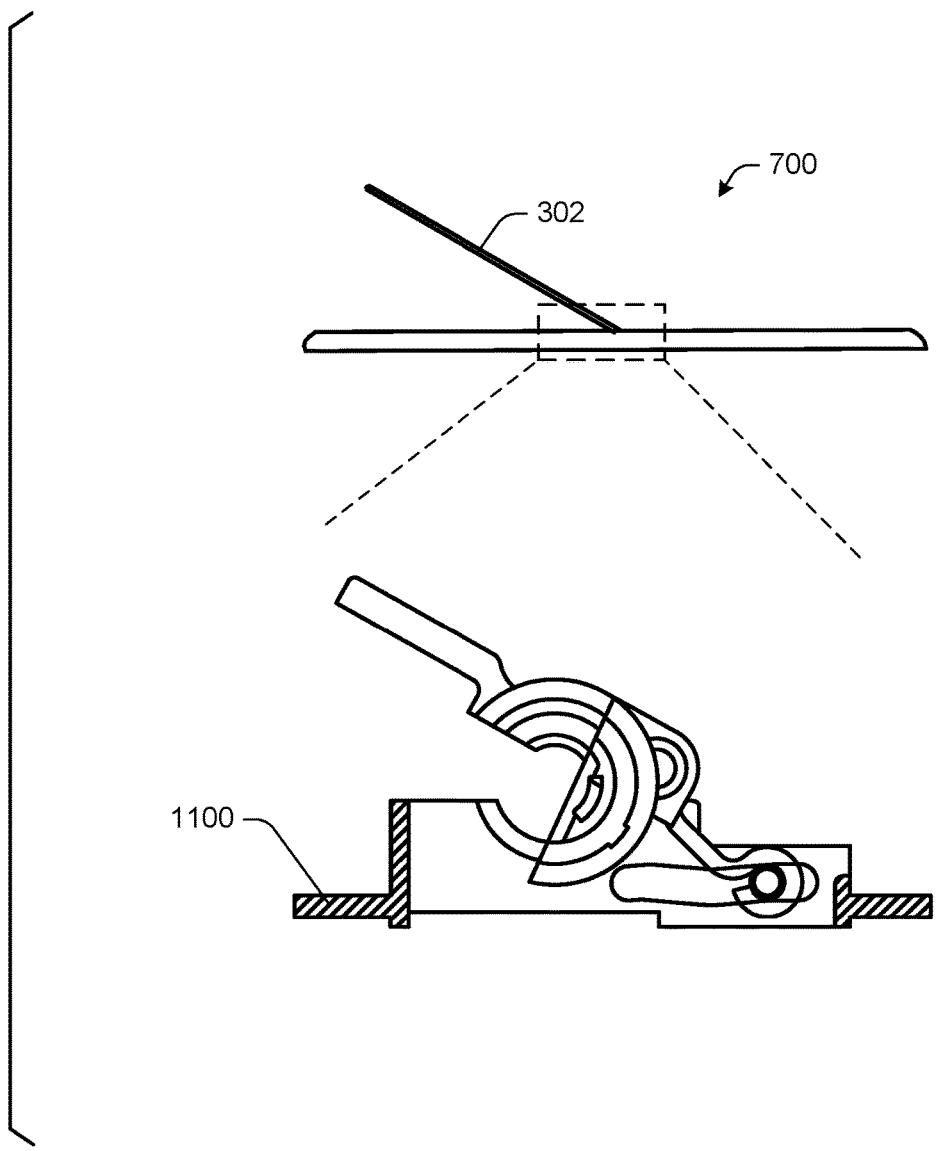
FIG. 20 depicts a side cutaway view of an example hinge.

FIG. 20 depicts a side cutaway view of the hinge 1100 opened to the position 700 in accordance with one or more implementations. For instance, a user manipulates the kickstand 302 from the preset open position 600 to the position 700 introduced with reference to FIG. 7.

Figure 21:
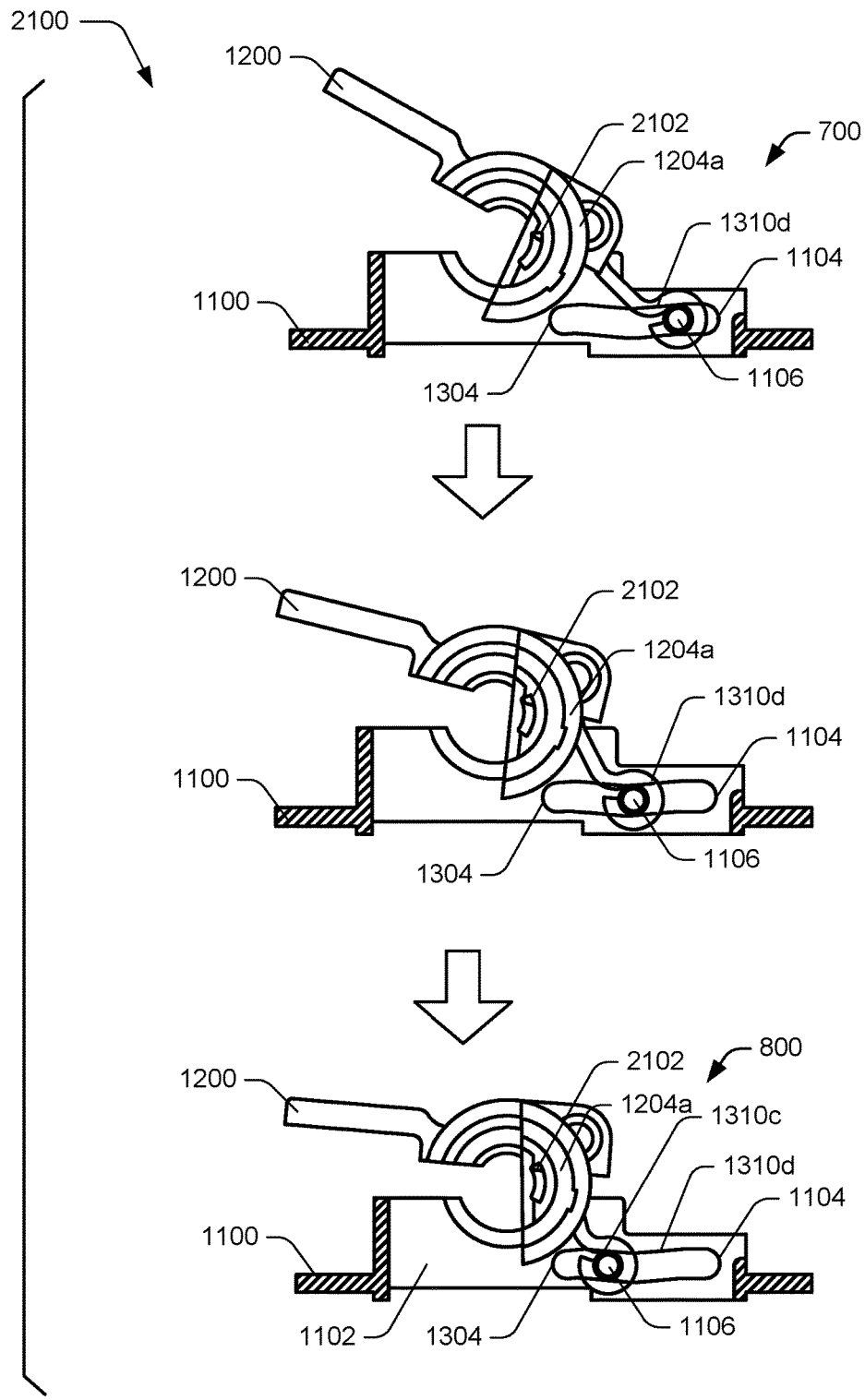
FIG. 21 depicts an implementation scenario for opening of a hinge.

FIG. 21 depicts an implementation scenario 2100 for further opening of the hinge 1100 in accordance with one or more implementations. The depictions of the hinge 1100 in the scenario 2100 show a side cutaway view of the hinge 1100. In at least some implementations, the scenario 2100 represents a continuation of the scenarios 1500, 1700, 1900 described above.

In the scenario 2100, the hinge 1100 is opened further past the position 700 to the position 800. In moving to the position 800, the guide pin 1106 moves toward the first end 1304 of the guide slot 1104 from the zone 1310d to the zone 1310c. Accordingly, the amount of rotation of the friction pin 1400 relative to the hinge band 1202 when the hinge 1100 moves to the position 800 is determined by the slot angle of the guide slot 1104 as the guide pin 1106 moves from the zone 1310d to the zone 1310c. This amount of rotation determines the torque output of the hinge 1100 as the hinge moves to the position 800.

The scenario 2100 also shows that the pivot member 1200 includes a plate catch 2102 that engages with the support plate 1204a and causes the support plate 1204a to rotate along with the pivot member 1200. This implementation is presented for purpose of example only, and it is to be appreciated that the plate catch 2102 can be implemented in various ways to engage with the support plate 1204a at a different angle not expressly described herein.

In at least some implementations, the position 800 represents maximum open position for the kickstand 302. For instance, the position 800 is a hard stop position for the pivot member 1200 such that the pivot member 1200 will not pivot further open relative to the hinge frame 1102. As depicted in a subsequent drawing, the support plate 1204a include a catch feature that engages with the hinge frame 1102 and prevents the support plate 1204a from rotating further out of the hinge frame 1102 past the position 800.

Figure 22:
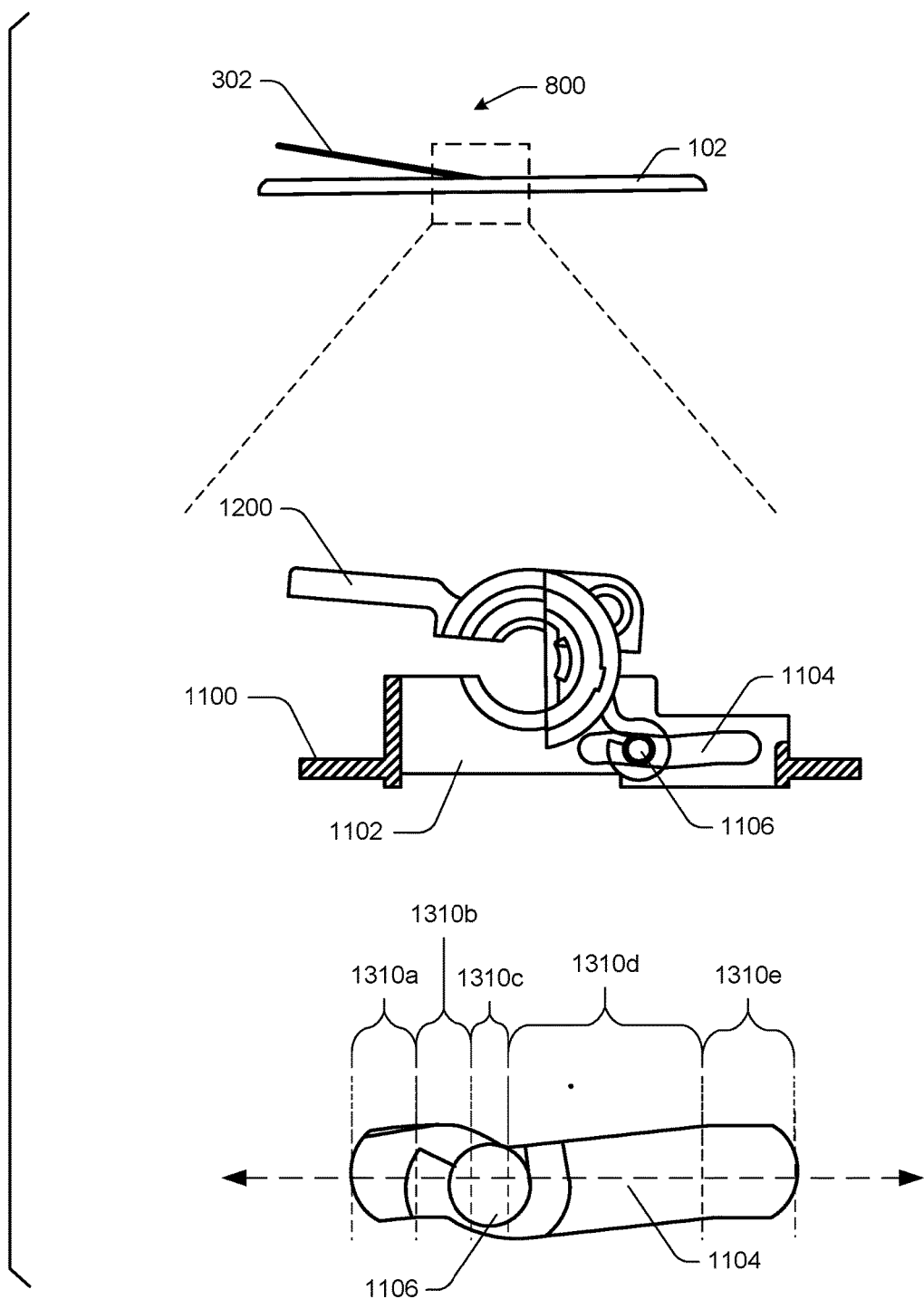
FIG. 22 depicts a side cutaway view of an example hinge.

FIG. 22 depicts a side cutaway view of the hinge 1100 opened to the position 800 in accordance with one or more implementations. For instance, a user manipulates the kickstand 302 from the open position 700 to the position 800 introduced with reference to FIG. 8. In at least some implementations, the position 800 represents a maximum opening position for the hinge 1100.

In moving from the position 700 to the position 800, the guide pin 1106 transitions from the zone 1310d to the zone 1310c of the guide slot 1104. Notice that the slot angle changes from the zone 1310d to the zone 1310c. In at least some implementations, the slot angle of the zone 1310c is configured to prevent the hinge 1100 from getting stuck in the position 800. For instance, the slot angle in the zone 1310c allows the guide pin 1106 to move smoothly back to the zone 1310d when a user closes the kickstand 302 from the position 800.

FIG. 22 further illustrates that in the position 800, the pivot member 1200 is fully removed from within the hinge frame 1102. The pivot member 1200, however, remains engaged with the support plate 1204a and the support plate 1204a remains engaged with the hinge frame 1102. Accordingly, in the position 800, the support plate 1204a connects the pivot member 1200 to the hinge frame 1102, and thus enables the hinge 1100 to remain as an interconnected and integrated hinge mechanism even when the pivot member 1200 is fully removed from within the hinge frame 1102. Although not specifically illustrated here, the pivot member 1200 may similarly engage with the support plate 1204b in addition to or alternatively to the support plate 1204a.

Figure 23:
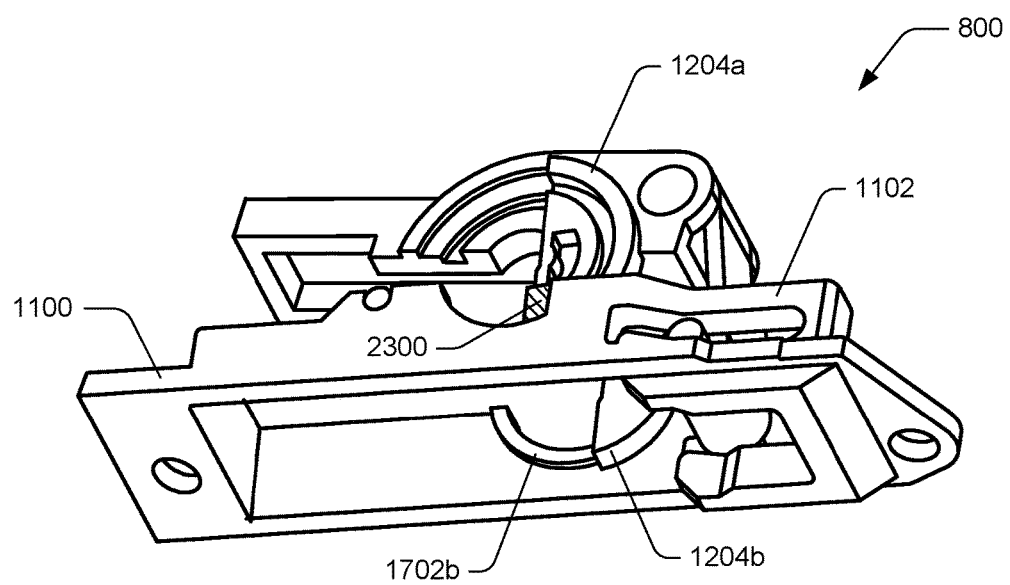
FIG. 23 depicts an isometric view of an example hinge.

FIG. 23 depicts an isometric view of the hinge 1100 in the position 800 in accordance with one or more implementations. This view shows a frame catch 2300 feature of the support plate 1204a engaged with the hinge frame 1102. The frame catch 2300 prevents the support plate 1204a from further rotating open past the position 800. As discussed previously, the pivot member 1200 includes the plate catch 2102 which engages with the support plate 1204a. Accordingly, engagement of the plate catch 2102 with the support plate 1204a, and engagement of the frame catch 2300 with the hinge frame 1102 prevents further pivoting of the pivot member 1200 past the position 800.

FIG. 23 also shows a support guide 1702b on the inner surface of the hinge frame 1102. In a similar manner to the support guide 1702a discussed with reference to the scenario 1700, the support guide 1702b represents an arcuate protrusion on the inner surface of the hinge frame 1102 that engages with the support plate 1204b and guides rotation of the support plate 1204b relative to the hinge frame 1102. The support plate 1204b, for instance, includes a guide slot that engages with the support guide 1702b to control movement of the support plate 1204b when the pivot member 1200 is pivoted between various positions.

Figure 24:
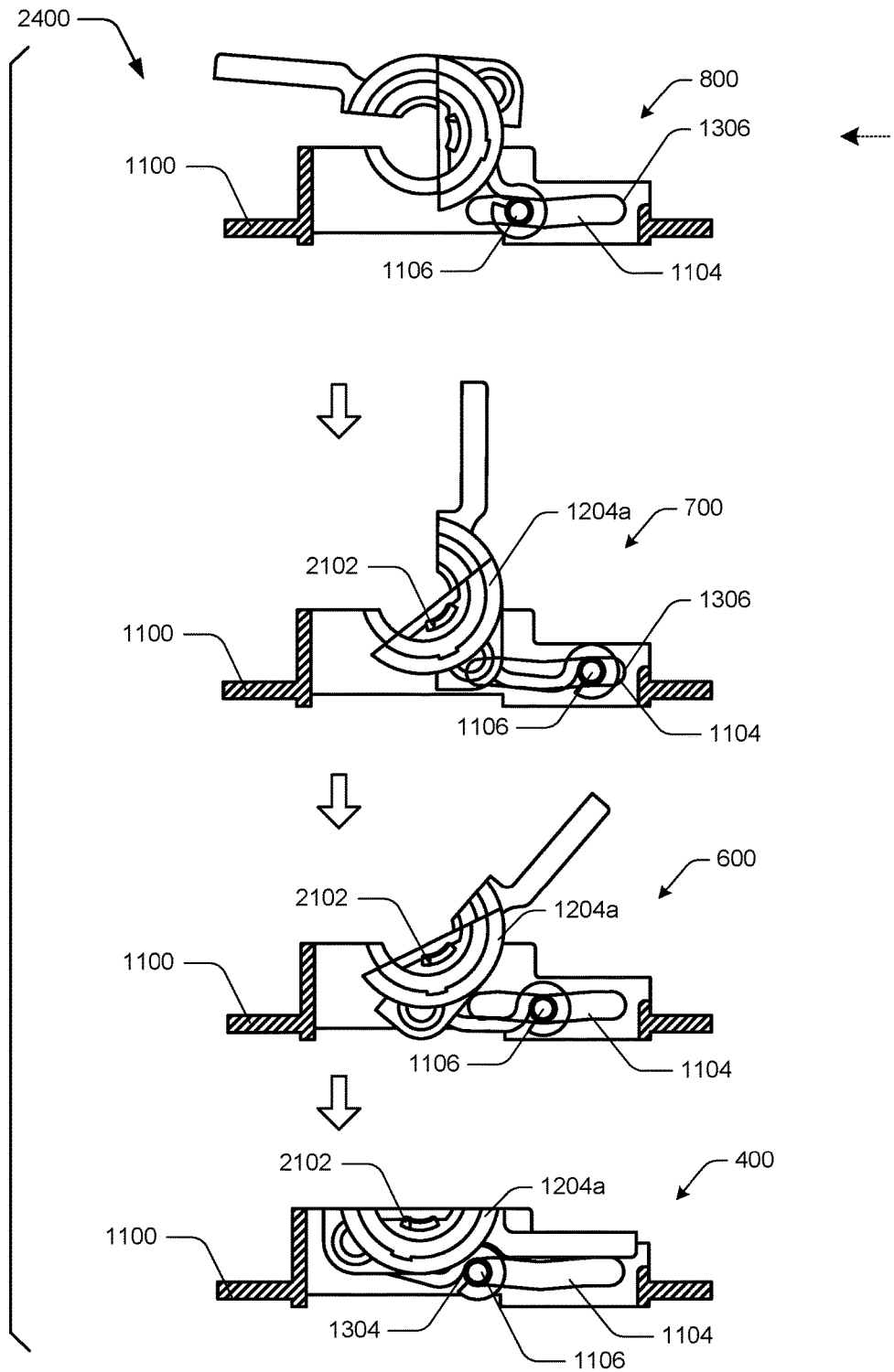
FIG. 24 depicts an example scenario for closing a hinge.

FIG. 24 depicts an example scenario 2400 for closing the hinge 1100 in accordance with one or more implementations. The scenario 2400, for instance, represents a scenario where the kickstand 302 is closed from a fully open position to a fully closed position. The upper portion of the scenario 2400 shows the hinge 1100 being moved in a closing direction from the position 800 to the position 700. For instance, a user manipulates the kickstand 302 from the position 800 to the position 700. As the hinge 1100 moves from the position 800 to the position 700, the guide pin 1106 moves toward the second end 1306 of the guide slot 1104. As detailed above, the slot angle of the guide slot 1104 determines the torque output of the hinge 1100 as the hinge 1100 moves from the position 800 to the position 700.

Continuing through the scenario 2400, the hinge 1100 moves to the position 600 and then to the position 400, i.e., a fully closed position. A user, for instance, manipulates the kickstand 302 to a closed position relative to the client device 102. Notice that as the hinge 1100 closes, the plate catch 2102 engages with the support plate 1204a such that the pivot member 1200 pulls the support plate 1204a and the support plate 1204a moves along with the pivot member 1200 to the closed position 400.

As illustrated in the lower portion of the scenario 2400, moving the hinge 1100 to the position 400 causes the guide pin 1106 to move to the first end 1304 of the guide slot 1104. Thus, the guide pin 1106 remains engaged within the guide slot 1104 during movement of the hinge 1100 between various open positions, and back to a closed position.

Having discussed some example kickstand and hinge positions, consider now a discussion of an example responsiveness profile associated with movement between the different hinge positions.

Hinge Response Profile

Considering the different positions of the hinge 1100 and the kickstand 302 discussed above, a torque response profile (i.e., the "torque output") experienced during movement of the kickstand 302 between the different positions is determined based on the amount of rotation of the friction pin 1400 relative to the hinge band 1202. Thus, varying the slot angle of the guide slot 1104 allows for fine-tuning of the torque output of the hinge 1100 by contributing to variations in an amount of rotation of the friction pin 1400 relative to the hinge band 1202 when the guide pin 1106 traverses the different zones of the guide slot 1104.

In at least some examples, the torque output of the hinge 1100 can be characterized via torque profiles that indicate various forces that occur during movement of the kickstand 302 between various positions. Consider, for example, the following example torque profiles.

Figure 25:
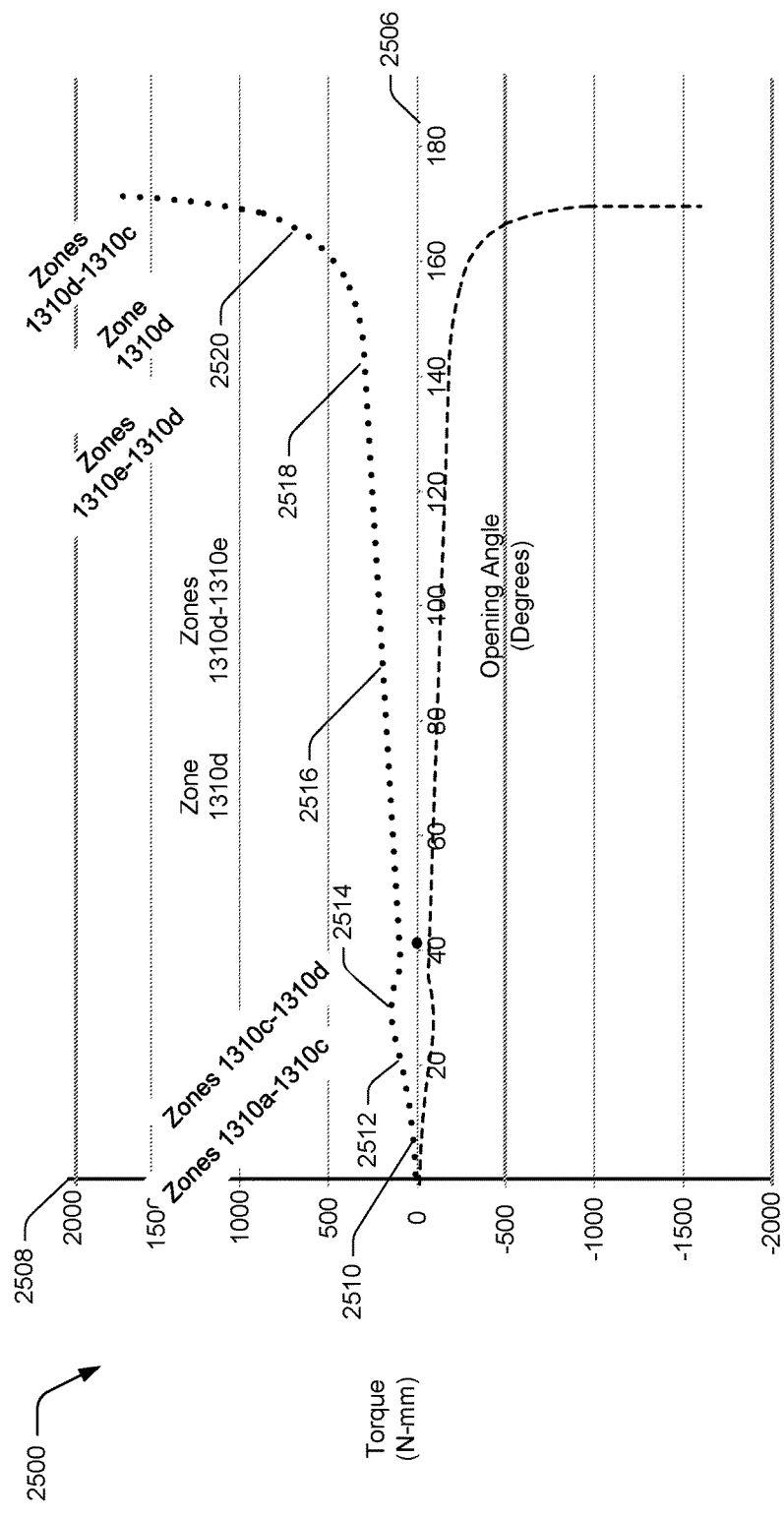
FIG. 25 illustrates a torque graph for an example hinge.

FIG. 25 illustrates a torque graph 2500 that includes an opening torque curve 2502 and a closing torque curve 2504. The torque graph 2500 further includes an angle axis 2506 and a torque axis 2508. The angle axis 2506 (e.g., the x-axis) indicates opening angle values for the kickstand 302 relative to an associated apparatus, e.g., the client device 102. The torque axis 2508 (e.g., the y-axis) indicates different torque values for the torque graph 2500. In this example, the torque values are indicated in Newton-millimeters (N-mm). This is not to be interpreted as limiting, however, and torque values may be measured in a variety of different units. Further, different forces may be measured to characterize the movement of the hinge 1100 and/or the kickstand 302.

According to one or more implementations, the opening torque curve 2502 represents torque transferred from the kickstand 302 to the pivot member 1200 when the kickstand is opened (e.g., via user manipulation) from a closed position to various open positions. The closing torque curve 2504 represents torque transferred from the kickstand 302 to the pivot member 1200 when the kickstand is moved (e.g., via user manipulation) from various open positions towards a closed position.

Generally, the different torque curves are associated with certain "action points" or "action regions" that demonstrate the overall responsiveness profile of the hinge mechanism discussed herein. The torque forces represented at different portions of the torque curves, for example, correspond to the different action zones of the guide slot 1104 discussed above.

For instance, a curve region 2510 represents the torque profile of the hinge 1100 when the hinge 1100 is initially opened and the guide pin 1106 is moving through the guide slot 1104 from the zone 1310a to the zone 1310b. A curve 2512 represents the torque profile of the hinge 1100 as the hinge 1100 continues to open and the guide pin 1106 moves through the guide slot 1104 from the zone 1310b to the zone 1310c. Notice that in the curve region 2512, the rate of increase in torque affecting the hinge 1100 increases as compared to the curve region 2510.

As the hinge 1100 continues to open, a curve region 2514 represents the torque when the guide pin 1106 moves across the zone 1310c. A curve region 2516 and a curve region 2518 represent torque forces that apply as the hinge 1100 continues to open and the guide pin 1106 moves through the zone 1310d to the zone 1310e to the second end 1306 of the guide slot 1104, and then returns through the zone 1310d. When the hinge approaches a maximum open position (e.g., the position 800), the torque forces resisting further opening of the hinge 1100 rapidly increase, as shown in a curve region 2520. The curve region 2520, for instance, represents torque forces that apply when the hinge 1100 approaches the position 800 and the guide pin 1106 transitions from the zone 1310d to the zone 1310c. The slot angle of the zone 1310c is such that torque resistance to further opening of the hinge 1100 rapidly increases. Further, in at least some implementations and as discussed above, the hinge 1100 may reach a maximum open position such that the hinge 1100 will not open further.

When closing the kickstand 302 from an open position, torque acting on the pivot member 1200 is characterized by the closing torque curve 2504. Generally, the interpretation of the closing torque curve 2504 is opposite that of the opening torque curve 2502 since the direction of motion (e.g., closing vs. opening) is reversed. In at least some implementations, for example, negative torque values on the closing torque curve 2504 represent closing torque applied by the user to the kickstand 302. Notice that in this example, the closing torque indicated by the closing torque curve 2504 at a particular hinge angle is less than a corresponding opening torque indicated by the opening torque curve 2502 at the same angle. In at least some implementations, this difference in opening torque and closing torque at a particular angle results from tightening and opening of the hinge band 1202 relative to the friction pin 1400, as discussed above.

Generally, the torque graph 2500 is based on the profile of the guide slot 1104 illustrated in the accompanying figures. For instance, as referenced above changing the profile of the guide slot 1104 changes the rotational velocity of the friction pin 1400 relative to the hinge band 1202. Generally, changing the contour of the first edge 1300 and/or the second edge 1302 of the guide slot changes the opening torque curve 2502, such as by increasing or decreasing torque values at different points along the curve. Thus, changing the profile of the guide slot 1104 will change the torque output of the hinge 1100 during movement of the kickstand 302. Accordingly, torque response of the hinge 1100 may be customized by changing the inner surface profile along different surfaces the guide slot 1104.

According to various implementations, if a user manipulates the kickstand 302 to any position represented along the torque curves 2502, 2504 and releases the kickstand 302, the hinge 1100 and thus the kickstand 302 will remain in the released position absent external force to move the kickstand 302 from that position. For instance, resistance to rotation of the friction pin 1400 relative to the hinge band 1202 enables the hinge, and thus an attached component, to persist in various open positions to support a variety of different usage scenarios.

Accordingly, implementations discussed herein provide a hinge mechanism that enables an attached component (e.g., a kickstand) to be adjusted between multiple positions. It is to be appreciated that the example device orientations, kickstand positions, hinge positions, component scale, torque values, and so forth discussed above are presented for purposes of example only. Thus, a wide variety of different device orientations, kickstand positions, hinge positions, and torque values not specifically mentioned herein may be implemented within the spirit and scope of the claimed implementations.

Example System and Device

Figure 26:
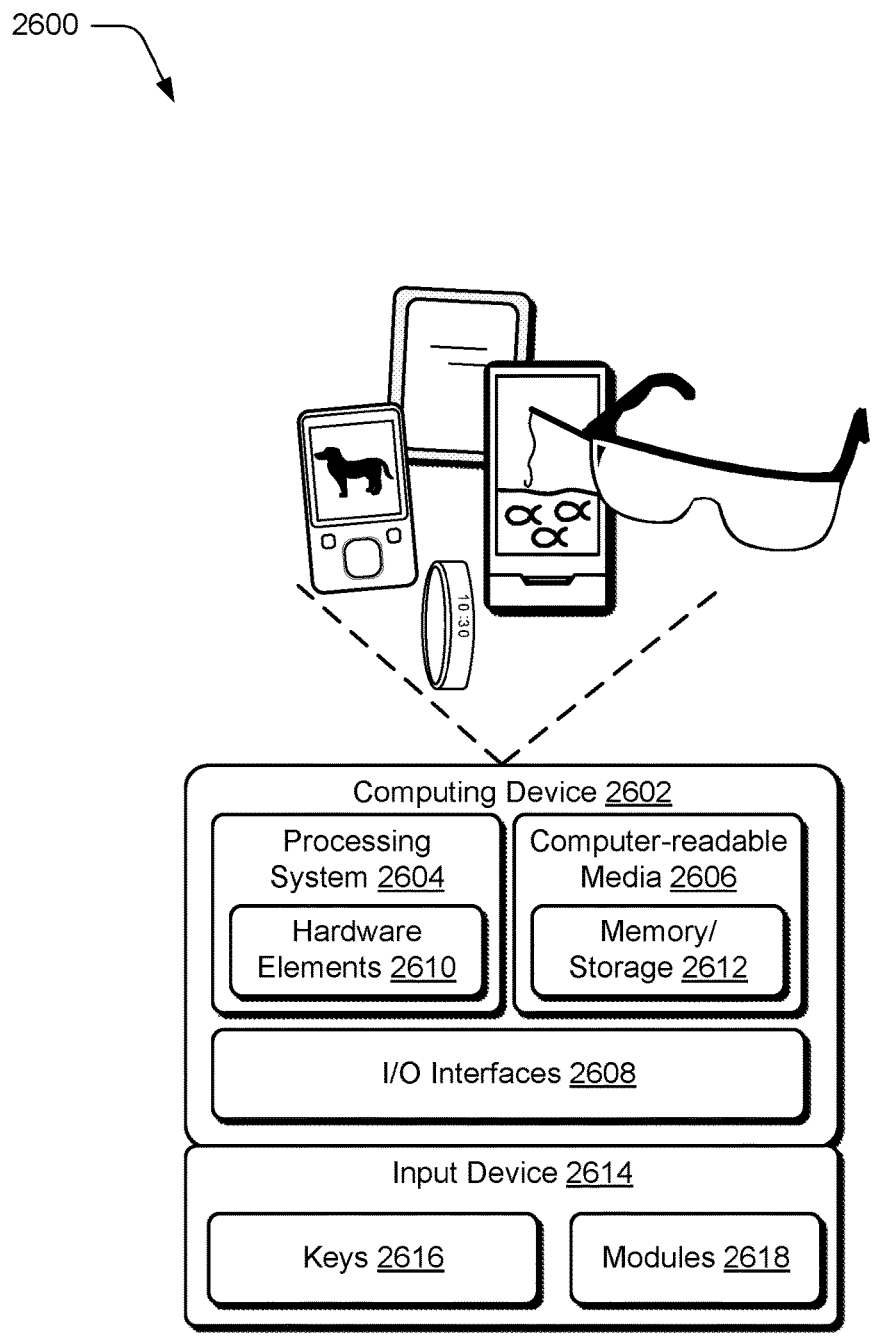
FIG. 26 illustrates an example system including various components of an example device that can be implemented as any type of computing device as described with reference to FIGS. 1-25 to implement examples of the techniques described herein.

FIG. 26 illustrates an example system generally at 2600 that includes an example computing device 2602 that is representative of one or more computing systems and/or devices that may implement the various techniques described herein. In at least some implementations, the computing device 2602 represents an implementation of the client device 102 discussed above. The computing device 2602 may be, for example, be configured to assume a mobile configuration through use of a housing formed and sized to be grasped and carried by one or more hands of a user, illustrated examples of which include a mobile phone, mobile game and music device, and tablet computer although other examples are also contemplated. In at least some implementations, the client device 102 may be implemented as a wearable device, such as a smart watch, smart glasses, and so forth.

The example computing device 2602 as illustrated includes a processing system 2604, one or more computer-readable media 2606, and one or more I/O interface 2608 that are communicatively coupled, one to another. Although not shown, the computing device 2602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2604 is representative of functionality to perform one or more operations using hardware. Accordingly, the processing system 2604 is illustrated as including hardware element 2610 that may be configured as processors, functional blocks, and so forth. This may include implementation in hardware as an application specific integrated circuit or other logic device formed using one or more semiconductors. The hardware elements 2610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2606 is illustrated as including memory/storage 2612. The memory/storage 2612 represents memory/storage capacity associated with one or more computer-readable media. The memory/storage component 2612 may include volatile media (such as random access memory (RAM)) and/or nonvolatile media (such as read only memory (ROM), Flash memory, optical disks, magnetic disks, and so forth). The memory/storage component 2612 may include fixed media (e.g., RAM, ROM, a fixed hard drive, and so on) as well as removable media (e.g., Flash memory, a removable hard drive, an optical disc, and so forth). The computer-readable media 2606 may be configured in a variety of other ways as further described below.

Input/output interface(s) 2608 are representative of functionality to allow a user to enter commands and information to computing device 2602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2602 may be configured in a variety of ways to support user interaction.

The computing device 2602 is further illustrated as being communicatively and physically coupled to an input device 2614 that is physically and communicatively removable from the computing device 2602. In this way, a variety of different input devices may be coupled to the computing device 2602 having a wide variety of configurations to support a wide variety of functionality. In this example, the input device 2614 includes one or more keys 2616, which may be configured as pressure sensitive keys, mechanically switched keys, and so forth.

The input device 2614 is further illustrated as include one or more modules 2618 that may be configured to support a variety of functionality. The one or more modules 2618, for instance, may be configured to process analog and/or digital signals received from the keys 2616 to determine whether a keystroke was intended, determine whether an input is indicative of resting pressure, support authentication of the input device 2614 for operation with the computing device 2602, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2602. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2610 and computer-readable media 2606 are representative of modules, programmable device logic and/or fixed device logic implemented in a hardware form that may be employed in some examples to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2610. The computing device 2602 may be configured to implement particular instructions and/or functions corresponding to the software and/or hardware modules. Accordingly, implementation of a module that is executable by the computing device 2602 as software may be achieved at least partially in hardware, e.g., through use of computer-readable storage media and/or hardware elements 2610 of the processing system 2604. The instructions and/or functions may be executable/operable by one or more articles of manufacture (for example, one or more computing devices 2602 and/or processing systems 2604) to implement techniques, modules, and examples described herein.

Conclusion

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

Implementations discussed herein include:

EXAMPLE 1

A device including: a support component movably attached to a rear portion of the device; and at least one hinge that moveably attaches a portion of the support component to the device, the hinge including: a hinge frame; a pivot member pivotably engaged with the hinge frame, the pivot member attached to the support component; a friction pin attached to the pivot member; and a hinge band with a guide pin slidably engaged with a guide slot within the hinge frame, the friction pin rotatably engaged with the hinge band such that during pivoting of the pivot member relative to the hinge frame, the friction pin rotates relative to the hinge band and frictional resistance to rotation of the friction pin relative to the hinge band contributes to a torque profile of the hinge, the guide slot having a variable slot angles relative to a longitudinal axis of the hinge frame.

EXAMPLE 2

A device as described in example 1, wherein the support component is configured to support different orientations of the device relative to an adjacent surface.

EXAMPLE 3

A device as described in one or more of examples 1 or 2, wherein the variable slot angles cause variations in torque resistance to opening of the hinge during pivoting of the pivot member relative to the hinge frame, the variations in torque resistance resulting from: movement of the guide pin through the variable slot angles; and variations in an amount of rotation of the friction pin relative to the hinge band caused by the movement of the guide pin through the variable slot angles.

EXAMPLE 4

A device as described in one or more of examples 1-3, wherein the guide slot includes different action zones that have different respective slot angles relative to the longitudinal axis of the hinge frame.

EXAMPLE 5

A device as described in one or more of examples 1-4, wherein the guide slot includes different action zones that have different respective slot angles relative to the longitudinal axis of the hinge frame, the different action zones corresponding to different longitudinal portions of the guide slot.

EXAMPLE 6

A device as described one or more of examples 1-5, wherein the guide slot includes different action zones that have different respective slot angles relative to the longitudinal axis of the hinge frame, the different respective slot angles causing variations in an amount of rotation of the friction pin relative to the hinge band when the guide pin moves through the variable slot angles, and the variations in the amount of rotation of the friction pin relative to the hinge band causing variations in torque resistance to opening of the hinge during pivoting of the pivot member relative to the hinge frame.

EXAMPLE 7

A device as described in one or more of examples 1-6, wherein the hinge further includes one or more support plates slidably engaged with one or more support guides on an interior surface of the hinge frame, the pivot member slidably engaged with the one or more support plates such that the pivot member is rotatable from within the hinge frame to a position outside of the hinge frame while remaining engaged with the one or more support plates.

EXAMPLE 8

A device as described in one or more of examples 1-7, wherein the friction pin is engaged at a first end of the hinge band, and the guide pin is engaged at a second end of the hinge band opposite the first end.

EXAMPLE 9

A hinge including: a hinge frame; a pivot member pivotably engaged with the hinge frame; a friction pin attached to the pivot member; and a hinge band with a guide pin slidably engaged with a guide slot within the hinge frame, the friction pin rotatably engaged with the hinge band such that during pivoting of the pivot member relative to the hinge frame, the friction pin rotates relative to the hinge band and frictional resistance to rotation of the friction pin relative to the hinge band contributes to a torque profile of the hinge, the guide slot having different action zones that have different respective slot angles relative to a longitudinal axis of the hinge frame.

EXAMPLE 10

A hinge as described in example 9, wherein the pivot member includes a mounting portion for mounting a moveable component to the hinge.

EXAMPLE 11

A hinge as described in one or more of examples 9 or 10, wherein the different action zones correspond to different longitudinal portions of the guide slot.

EXAMPLE 12

A hinge as described in one or more of examples 9-11, wherein the different respective slot angles cause variations in torque resistance to opening of the hinge during pivoting of the pivot member relative to the hinge frame, the variations in torque resistance resulting from: movement of the guide pin through the different action zones; and variations in an amount of rotation of the friction pin relative to the hinge band caused by the movement of the guide pin through the variable slot angles.

EXAMPLE 13

A hinge as described in one or more of examples 9-12, wherein the hinge further includes: a first support plate slidably engaged with a first support guide on a first interior surface of the hinge frame; and a second support plate slidably engaged with a second support guide on a second interior surface of the hinge frame opposite the first interior surface, the pivot member slidably engaged with the first support plate and the second support plate such that the pivot member is rotatable from within the hinge frame to a position outside of the hinge frame while remaining engaged with the first support plate and the second support plate.

EXAMPLE 14

A hinge as described in one or more of examples 9-13, wherein the hinge band at least partially wraps the friction pin such that when the hinge pivots toward an open position, the friction pin rotates relative to the hinge band and the hinge band tightens at least partially around the friction pin.

EXAMPLE 15

An apparatus including: a chassis; a moveable component moveably attached to the chassis; and a hinge that moveably attaches the moveable component to the chassis, the hinge including: a hinge frame; a pivot member pivotably engaged with the hinge frame, the pivot member attached to the moveable component; a friction pin attached to the pivot member; and a hinge band with a guide pin slidably engaged with a guide slot within the hinge frame, the friction pin rotatably engaged with the hinge band such that during pivoting of the pivot member relative to the hinge frame, the friction pin rotates relative to the hinge band and frictional resistance to rotation of the friction pin relative to the hinge band contributes to a torque profile of the hinge, the guide slot having different action zones that have different respective slot angles relative to the hinge frame.

EXAMPLE 16

An apparatus as described in example 15, wherein the guide slot includes different action zones that have different respective slot angles relative to a longitudinal axis of the hinge frame, the different respective slot angles causing variations in an amount of rotation of the friction pin relative to the hinge band when the guide pin moves through the variable slot angles, and the variations in the amount of rotation of the friction pin relative to the hinge band causing variations in torque resistance to opening of the hinge during pivoting of the pivot member relative to the hinge frame.

EXAMPLE 17

An apparatus as described in one or more of examples 15 or 16, wherein the different action zones correspond to different longitudinal portions of the guide slot.

EXAMPLE 18

An apparatus as described in one or more of examples 15-17, wherein the hinge further includes one or more support plates slidably engaged with one or more support guides on an interior surface of the hinge frame, the pivot member slidably engaged with the one or more support plates such that the pivot member is rotatable from within the hinge frame to a position outside of the hinge frame while remaining engaged with the one or more support plates.

EXAMPLE 19

An apparatus as described in one or more of examples 15-18, wherein the friction pin is engaged at a first end of the hinge band, and the guide pin is engaged at a second end of the hinge band opposite the first end.

EXAMPLE 20

An apparatus as described in one or more of examples 15-19, wherein the different respective slot angles differ relative to a longitudinal axis of the hinge frame.

What is claimed is:

1. A device comprising:
   a support component movably attached to a rear portion of the device; and
   at least one hinge that moveably attaches a portion of the support component to the device, the hinge including:
     a hinge frame;
     a pivot member pivotably engaged with the hinge frame, the pivot member attached to the support component;
     a friction pin attached to the pivot member; and
     a hinge band with a guide pin slidably engaged with a guide slot within the hinge frame, the friction pin rotatably engaged with the hinge band such that during pivoting of the pivot member relative to the hinge frame, the friction pin rotates relative to the hinge band and frictional resistance to rotation of the friction pin relative to the hinge band contributes to a torque profile of the hinge, the guide slot having variable slot angles relative to a longitudinal axis of the hinge frame.

2. A device as recited in claim 1, wherein the support component is configured to support different orientations of the device relative to an adjacent surface.

3. A device as recited in claim 1, wherein the variable slot angles cause variations in torque resistance to opening of the hinge during pivoting of the pivot member relative to the hinge frame, the variations in torque resistance resulting from:
   movement of the guide pin through the variable slot angles; and
   variations in an amount of rotation of the friction pin relative to the hinge band caused by the movement of the guide pin through the variable slot angles.

4. A device as recited in claim 1, wherein the guide slot includes different action zones that have different respective slot angles of the variable slot angles relative to the longitudinal axis of the hinge frame.

5. A device as recited in claim 1, wherein the guide slot includes different action zones that have different respective slot angles of the variable slot angles relative to the longitudinal axis of the hinge frame, the different action zones corresponding to different longitudinal portions of the guide slot.

6. A device as recited in claim 1, wherein the guide slot includes different action zones that have different respective slot angles of the variable slot angles relative to the longitudinal axis of the hinge frame, the different respective slot angles causing variations in an amount of rotation of the friction pin relative to the hinge band when the guide pin moves through the variable slot angles, and the variations in the amount of rotation of the friction pin relative to the hinge band causing variations in torque resistance to opening of the hinge during pivoting of the pivot member relative to the hinge frame.

7. A device as recited in claim 1, wherein the hinge further comprises one or more support plates slidably engaged with one or more support guides on an interior surface of the hinge frame, the pivot member slidably engaged with the one or more support plates such that the pivot member is rotatable from within the hinge frame to a position outside of the hinge frame while remaining engaged with the one or more support plates.

8. A device as recited in claim 1, wherein the friction pin is engaged at a first end of the hinge band, and the guide pin is engaged at a second end of the hinge band opposite the first end.

9. A hinge comprising:
a hinge frame;
a pivot member pivotably engaged with the hinge frame;
a friction pin attached to the pivot member; and
a hinge band with a guide pin slidably engaged with a guide slot within the hinge frame, the friction pin rotatably engaged with the hinge band such that during pivoting of the pivot member relative to the hinge frame, the friction pin rotates relative to the hinge band and frictional resistance to rotation of the friction pin relative to the hinge band contributes to a torque profile of the hinge, the guide slot having different action zones that have different respective slot angles relative to a longitudinal axis of the hinge frame.

10. A hinge as recited in claim 9, wherein the pivot member includes a mounting portion for mounting a moveable component to the hinge.

11. A hinge as recited in claim 9, wherein the different action zones correspond to different longitudinal portions of the guide slot.

12. A hinge as recited in claim 9, wherein the different respective slot angles cause variations in torque resistance to opening of the hinge during pivoting of the pivot member relative to the hinge frame, the variations in torque resistance resulting from:
movement of the guide pin through the different action zones; and
variations in an amount of rotation of the friction pin relative to the hinge band caused by the movement of the guide pin through the different respective slot angles.

13. A hinge as recited in claim 9, wherein the hinge further comprises:
a first support plate slidably engaged with a first support guide on a first interior surface of the hinge frame; and
a second support plate slidably engaged with a second support guide on a second interior surface of the hinge frame opposite the first interior surface, the pivot member slidably engaged with the first support plate and the second support plate such that the pivot member is rotatable from within the hinge frame to a position outside of the hinge frame while remaining engaged with the first support plate and the second support plate.

14. A hinge as recited in claim 9, wherein the hinge band at least partially wraps the friction pin such that when the hinge pivots toward an open position, the friction pin rotates relative to the hinge band and the hinge band tightens at least partially around the friction pin.

15. An apparatus comprising:
a chassis;
a moveable component moveably attached to the chassis; and
a hinge that moveably attaches the moveable component to the chassis, the hinge including:
a hinge frame;
a pivot member pivotably engaged with the hinge frame, the pivot member attached to the moveable component;
a friction pin attached to the pivot member; and
a hinge band with a guide pin slidably engaged with a guide slot within the hinge frame, the friction pin rotatably engaged with the hinge band such that during pivoting of the pivot member relative to the hinge frame, the friction pin rotates relative to the hinge band and frictional resistance to rotation of the friction pin relative to the hinge band contributes to a torque profile of the hinge, the guide slot having different action zones that have different respective slot angles relative to the hinge frame.

16. An apparatus as described in claim 15, the different respective slot angles causing variations in an amount of rotation of the friction pin relative to the hinge band when the guide pin moves through the different respective slot angles, and the variations in the amount of rotation of the friction pin relative to the hinge band causing variations in torque resistance to opening of the hinge during pivoting of the pivot member relative to the hinge frame.

17. An apparatus as described in claim 15, wherein the different action zones correspond to different longitudinal portions of the guide slot.

18. An apparatus as described in claim 15, wherein the hinge further comprises one or more support plates slidably engaged with one or more support guides on an interior surface of the hinge frame, the pivot member slidably engaged with the one or more support plates such that the pivot member is rotatable from within the hinge frame to a position outside of the hinge frame while remaining engaged with the one or more support plates.

19. An apparatus as described in claim 15, wherein the friction pin is engaged at a first end of the hinge band, and the guide pin is engaged at a second end of the hinge band opposite the first end.

20. An apparatus as described in claim 15, wherein the different respective slot angles differ relative to a longitudinal axis of the hinge frame.

* * * * *